US012205546B2

(12) United States Patent
Kang et al.

(10) Patent No.: US 12,205,546 B2
(45) Date of Patent: Jan. 21, 2025

(54) DISPLAY DEVICE AND METHOD OF DRIVING THE SAME

(71) Applicant: Samsung Display Co., LTD., Yongin-si (KR)

(72) Inventors: Sun-Koo Kang, Yongin-si (KR); Joonho Hyun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/416,559

(22) Filed: Jan. 18, 2024

(65) Prior Publication Data

US 2024/0304145 A1 Sep. 12, 2024

(51) Int. Cl.
*G09G 3/00* (2006.01)
*G09G 3/20* (2006.01)
*G09G 3/3233* (2016.01)

(52) U.S. Cl.
CPC ......... *G09G 3/3233* (2013.01); *G09G 3/2044* (2013.01); *G09G 2300/0819* (2013.01); *G09G 2300/0823* (2013.01); *G09G 2300/0852* (2013.01); *G09G 2300/0861* (2013.01); *G09G 2310/0291* (2013.01); *G09G 2310/08* (2013.01); *G09G 2320/0233* (2013.01); *G09G 2330/023* (2013.01)

(58) Field of Classification Search
CPC ... G09G 2300/0819; G09G 2300/0842; G09G 2300/0861; G09G 2310/0262; G09G 2320/0247; G09G 2320/103; G09G 2330/028; G09G 2340/0435; G09G 2360/16; G09G 3/3233; G09G 3/3258; G09G 3/3291
See application file for complete search history.

(56) References Cited

U.S. PATENT DOCUMENTS

| | | | |
|---|---|---|---|
| 11,127,335 | B2 | 9/2021 | Ahn et al. |
| 11,158,266 | B2 | 10/2021 | Baek et al. |
| 11,195,465 | B2 | 12/2021 | Lee et al. |
| 11,341,916 | B2 | 5/2022 | Lee et al. |
| 11,508,317 | B2 | 11/2022 | Ha et al. |

(Continued)

FOREIGN PATENT DOCUMENTS

| | | | |
|---|---|---|---|
| KR | 1020190138718 | A | 12/2019 |
| KR | 1020200010689 | A | 1/2020 |

(Continued)

*Primary Examiner* — Insa Sadio
(74) *Attorney, Agent, or Firm* — CANTOR COLBURN LLP

(57) ABSTRACT

A display device includes a display panel receiving an emission driving signal, and a panel driver driving the display panel in a mode in which the driving frequency is varied. The panel driver includes an emission driving circuit outputting the emission driving signal, a data driving circuit outputting a data signal, and a driving controller. The data driving circuit inverts a polarity of the data signal in units of at least one driving frame in response to a first option signal. The driving controller includes a counting circuit which counts an operation cycle of the emission driving circuit to output a count value, and a first option control circuit which compares the count value with a preset first threshold value and sets the first option signal to an active state or an inactive state according to a comparison result.

20 Claims, 14 Drawing Sheets

(56) References Cited

U.S. PATENT DOCUMENTS

| | | | |
|---|---|---|---|
| 11,545,083 B2 | 1/2023 | Chung et al. | |
| 2015/0091468 A1* | 4/2015 | Naruo | H05B 45/375 315/291 |
| 2019/0384735 A1* | 12/2019 | Schmitz | G06F 13/40 |
| 2021/0241699 A1 | 8/2021 | Lee et al. | |

FOREIGN PATENT DOCUMENTS

| | | | |
|---|---|---|---|
| KR | 1020200086783 | A | 7/2020 |
| KR | 1020210047417 | A | 4/2021 |
| KR | 1020220030389 | A | 3/2022 |
| KR | 1020220041509 | A | 4/2022 |
| KR | 102527847 | B1 | 5/2023 |

* cited by examiner

DISPLAY DEVICE AND METHOD OF DRIVING THE SAME

This application claims priority to Korean Patent Application No. 10-2023-0031384, filed on Mar. 9, 2023, and all the benefits accruing therefrom under 35 U.S.C. § 119, the content of which in its entirety is herein incorporated by reference.

BACKGROUND

Embodiments of the present disclosure relate to a display device and a method of driving the same, and more particularly, relate to a display device having an improved display quality and a method of driving the same.

Among display devices, a light emitting display device may display an image using a light emitting diode that generates light by recombination of electrons and holes. Such a light emitting display device generally has an advantage of having a fast response time and being driven with low power consumption.

The light emitting display device includes pixels which are connected to data lines and scan lines. Each of the pixels may include a light emitting diode and a pixel circuit unit controlling the amount of current flowing through the light emitting diode. The pixel circuit unit may control the amount of current flowing a first driving voltage to a second driving voltage via the light emitting diode in response to a data signal. Light having a predetermined luminance may be generated corresponding to the amount of current flowing through the light emitting diode.

SUMMARY

An embodiment of the present disclosure provides a display device capable of improving a display quality when operating in a variable frequency mode and a method of driving the same.

According to aspects of the present disclosure, a display device comprises a display panel and a panel driver. The display panel includes a light emitting element and a pixel circuit unit connected to the light emitting element and receiving an emission driving signal. The panel driver drives the display panel in a first mode in which a driving frequency is fixed or a second mode in which the driving frequency is varied.

The panel driver comprises an emission driving circuit, a data driving circuit, and a driving controller. The emission driving circuit outputs the emission driving signal to the display panel. The data driving circuit outputs a data signal to the display panel and inverts a polarity of the data signal in units of at least one driving frame in response to a first option signal. The driving controller controls operations of the emission driving circuit and the data driving circuit.

The driving controller comprises a counting circuit which counts an operation cycle of the emission driving circuit to output a count value in the second mode, and a first option control circuit which compares the count value with a preset first threshold value and sets the first option signal to an inactive state when the count value is greater than the preset first threshold value.

In a driving method of a display device according to aspects of the present disclosure, a display panel is operated in a first mode in which a driving frequency is fixed or a second mode in which the driving frequency is varied. The driving method comprises counting an operation cycle of an emission driving circuit outputting an emission driving signal to the display panel in the second mode to output a count value, comparing the count value with a preset first threshold value, setting a first option signal to an active state when the count value is equal to or less than the preset first threshold value, setting the first option signal to an inactive state when the count value is greater than the preset first threshold value, and performing an inversion operation of inverting a polarity of a data signal in units of at least one driving frame when the first option signal is in the active state or stopping the inversion operation of the data signal when the first option signal is in the inactive state.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
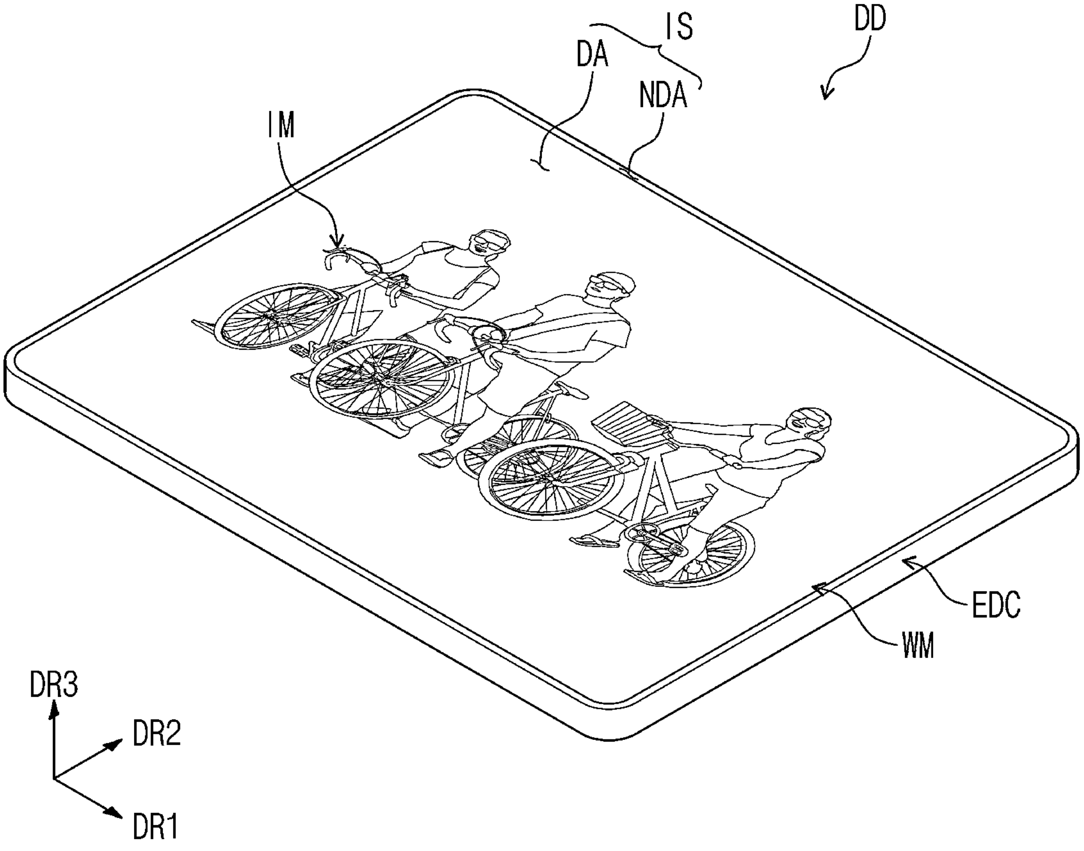
FIG. 1 is a perspective view of an embodiment of a display device according to aspects of the present disclosure.

In the specification, the expression that a first component (or area, layer, part, portion, or the like) is "on", "connected with", or "coupled to" a second component means that the first component is directly on, connected with, or coupled to the second component or means that a third component is interposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", and the like may be used to describe various components, the components should not be construed as being limited by the terms. The terms are used to differentiate one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "below", "on", "above", and the like are used to describe the correlation of components illustrated in drawings. The terms are relative and are described with reference to a direction indicated in the drawing.

It will be further understood that the terms "comprises", "includes", "have", and the like specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present invention belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present invention will be described with reference to accompanying drawings.

Figure 2:
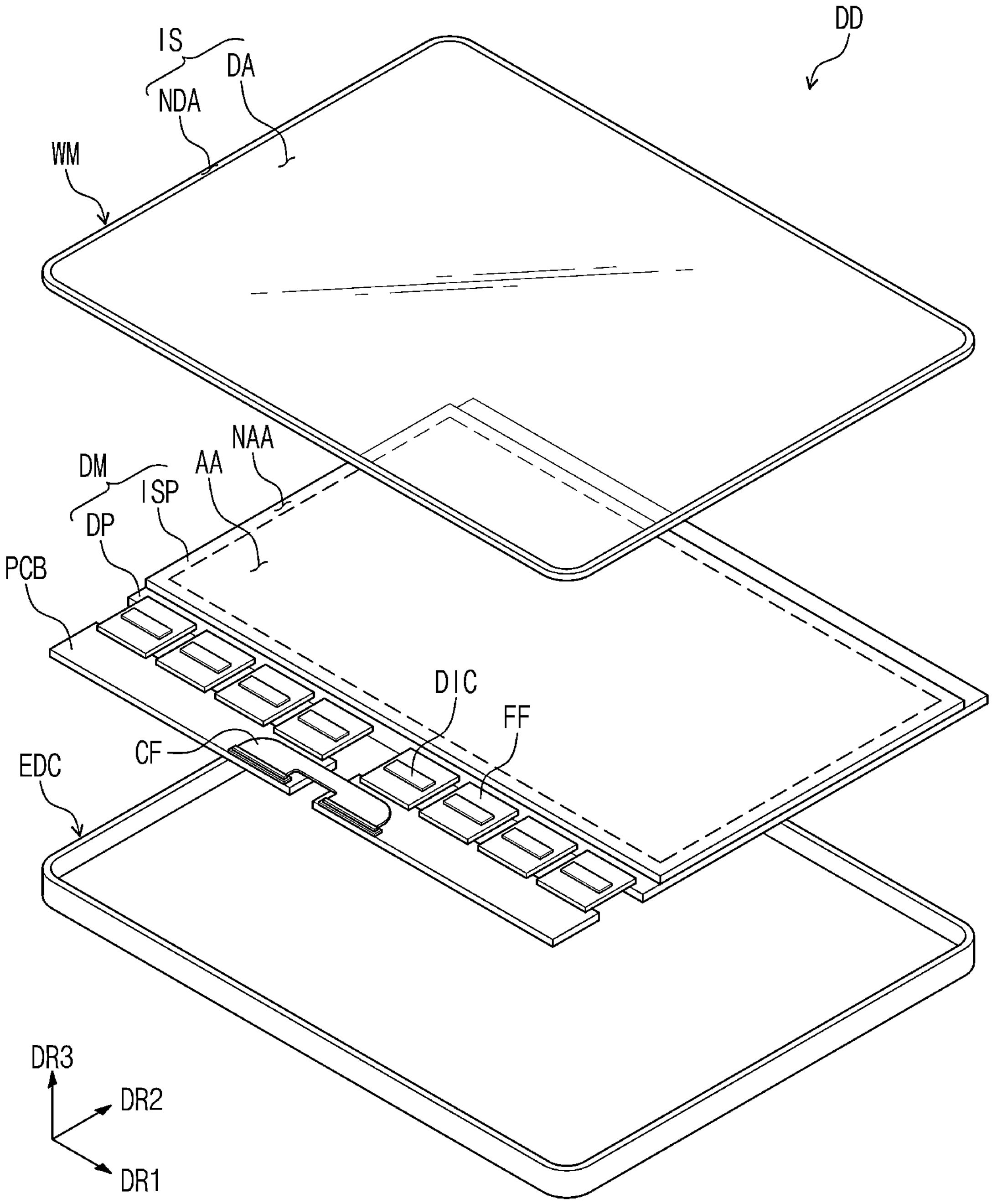
FIG. 2 is an exploded perspective view of an embodiment of a display device according to aspects of the present disclosure.

FIG. 1 is a perspective view of a display device according to aspects of the present disclosure, and FIG. 2 is an exploded perspective view of a display device according to aspects of the present disclosure.

Referring to FIGS. 1 and 2, a display device DD is a device which may be activated in response to an electrical signal. The display device DD according to the present invention may be a large-sized display device such as, for example, a television or a monitor, or a small/mid-sized display device such as, for example, a mobile phone, a tablet, a notebook computer, a car navigation system, and a game machine. These are merely presented as examples, and the display device DD may be implemented in other forms without departing from the concepts described herein. The display device DD has a rectangular shape having a long side in a first direction DR1 and a short side in a second direction DR2 crossing the first direction DR1. However, the shape of the display device DD is not limited thereto, and various shapes of the display device DD may be provided. The display device DD may display an image IM in a third direction DR3 on a display surface IS parallel to a DR1-DR2 plane associated with the first and second directions DR1 and DR2. The display surface IS on which the image IM is displayed may correspond to a front surface of the display device DD. It is to be understood that the terms "longer" and "shorter," when recited with respect to a shape of an object (e.g., "longer sides" and "shorter sides" of an object), are relative terms expressing dimensions of the object.

In the example illustrated at FIG. 1, the front surface (or upper surface) and a rear surface (or lower surface) of each member of the display device DD are defined based on a direction in which the image IM is displayed. The front surface and the rear surface may be opposite to each other in the third direction DR3, and a normal direction of each of the front surface and the rear surface may be parallel to the third direction DR3.

A distance between the front surface and the rear surface in the third direction DR3 may correspond to a thickness of the display device DD in the third direction DR3. In one or more embodiments, the directions indicated by the first to third directions DR1, DR2, and DR3 may be relative concepts and may be converted into other directions.

The display device DD may detect an external input applied from the outside. The external input may include various types of inputs provided from the outside of the display device DD. The display device DD according to aspects of the present disclosure may detect a user's external input applied from the outside. The user's external input may be any one or a combination of various types of external inputs, such as, for example, a part of the user's body, light, heat, gaze, or pressure. In addition, the display device DD may detect a user's external input applied to a side surface or the rear surface of the display device DD depending on a structure of the display device DD, and is not limited to any one embodiment. In one or more embodiments, the external input may include an input by an input device (e.g., a stylus pen, an active pen, a touch pen, an electronic pen, an e-pen, and the like).

The display surface IS of the display device DD may be divided into a display area DA and a non-display area NDA. The display area DA may be an area in which the image IM is displayed. A user may recognize the image IM through the display area DA. In one or more embodiments, the display area DA may have a rectangular shape with rounded vertices. However, aspects of the display area DA are illustrated by way of example, and the display area DA may have various shapes, and is not limited to any one embodiment.

The non-display area NDA is adjacent to the display area DA. The non-display area NDA may have a certain color. The non-display area NDA may surround the display area DA. Accordingly, the shape of the display area DA may be substantially defined by the non-display area NDA. However, aspects of the display area DA and the non-display area NDA are illustrated by way of example, and the non-display area NDA may be disposed adjacent to a single side of the display area DA, or may be omitted. The display device DD according to aspects of the present disclosure may include various embodiments, and is not limited to any one embodiment.

As shown in FIG. 2, the display device DD may include a display module DM and a window WM disposed on the display module DM. The display module DM may include a display panel DP and an input sensing layer ISP.

The display panel DP according to aspects of the present disclosure may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include quantum dots, quantum rods, and the like.

The display panel DP may output the image IM, and the image IM thus output may be displayed through the display surface IS.

The input sensing layer ISP may be disposed on the display panel DP and be capable of sensing an external input. The input sensing layer ISP may be directly disposed on the display panel DP. According to aspects of the present disclosure, the input sensing layer ISP may be formed on the display panel DP by a continuous process. That is, when the input sensing layer ISP is directly disposed on the display panel DP, an internal adhesive film (not shown) is not disposed between the input sensing layer ISP and the display panel DP. However, an internal adhesive film may be disposed between the input sensing layer ISP and the display panel DP. In this case, the input sensing layer ISP may be manufactured by a process different from the continuous process with the display panel DP, and may be manufactured through a process separate from the display panel DP, and the display panel DP then may be fixed to an upper surface of the display panel DP by the internal adhesive film.

The window WM may be formed of a transparent material capable of emitting the image IM. For example, the window WM may be formed of glass, sapphire, plastic, or the like. The window WM is illustrated as a single layer, but is not limited thereto and may include a plurality of layers.

Although not shown, the above-described non-display area NDA of the display device DD may be provided as an area in which a material including a certain color is printed on one area of the window WM. In one or more embodiments, the window WM may include a window light blocking pattern for defining the non-display area NDA. The window light blocking pattern may be formed as a colored organic layer, for example, by a coating method.

The window WM may be coupled to the display module DM through an adhesive film. In one or more embodiments, the adhesive film may include an optically clear adhesive film ("OCA" film). However, the adhesive film is not limited thereto, and may include a typical adhesive or sticking agent. For example, the adhesive film may include an optically clear resin ("OCR") or a pressure sensitive adhesive film ("PSA" film).

An anti-reflection layer may be further disposed between the window WM and the display module DM. The anti-reflection layer reduces reflectance of external light incident from an upper side of the window WM. The anti-reflection layer according to aspects of the present disclosure may include a phase retarder and a polarizer. The phase retarder may have a film type or liquid crystal coating type, and may include a λ/2 phase retarder and/or a λ4 phase retarder. The polarizer may also be of a film type or a liquid crystal coating type. The film type may include a stretched synthetic resin film, and the liquid crystal coating type may include liquid crystals arranged in a certain arrangement. The phase retarder and the polarizer may be implemented as one polarizing film.

In one or more embodiments, the anti-reflection layer may include color filters. An arrangement of the color filters may be determined in consideration of colors of light generated by a plurality of pixels PX (refer to FIG. 3) included in the display panel DP. In this case, the anti-reflection layer may further include a light blocking pattern disposed between color filters. filters The display module DM may display the image IM in response to an electrical signal and may transmit/receive information about an external input. The display module DM may be defined as an active area AA (also referred to herein as an effective area AA) and a non-active area NAA (also referred to herein as a non-effective area NAA). The active area AA may be defined as an area (i.e., an area where the image IM is displayed) where the image IM is emitted from the display panel DP. Also, the active area AA may be defined as an area in which the input sensing layer ISP senses an external input applied from the outside. According to an embodiment, the active area AA of the display module DM may correspond to (or overlap) at least a portion of the display area DA.

The non-active area NAA is adjacent to the active area AA. The non-active area NAA may be an area in which the image IM is not substantially displayed. For example, the non-active area NAA may surround the active area AA. However, this is illustrated by way of example, and the non-active area NAA may be defined in various shapes and is not limited to any one embodiment. According to an embodiment, the non-active area NAA of the display module DM may correspond to (or overlap) at least a portion of the non-display area NDA.

The display module DM may further include a plurality of flexible films FF connected to the display panel DP. A driving chip DIC may be mounted on each of the plurality of flexible films FF. In one or more embodiments, a data driving circuit 200 (see FIG. 3) is implemented with a plurality of driving chips DIC, and the plurality of driving chips DIC may be mounted on the plurality of flexible films FF, respectively.

The display module DM may further include at least one circuit board PCB coupled to the plurality of flexible films FF. In one or more embodiments, two circuit boards PCB are provided in the display device DD, a number of the circuit boards PCB is not limited thereto. Two adjacent circuit boards among the circuit boards PCB may be electrically connected to each other by a connection film CF. Also, at least one of the circuit boards PCB may be electrically connected to a main board. A driving controller 100 (see FIG. 3) and a voltage generator 400 (see FIG. 3) may be disposed on at least one of the circuit boards PCB.

FIG. 2 illustrates a structure in which the driver chips DIC are respectively mounted on the flexible films FF, but the present invention is not limited thereto. For example, the driver chips DIC may be directly mounted on the display panel DP. In this case, a portion of the display panel DP, on which the driver chip DIC is mounted, may be bent such that the driver chip DIC is disposed on a rear surface of the display module DM.

The input sensing layer ISP may be electrically connected to the circuit boards PCB through the flexible films FF. However, an embodiment of the present invention is not limited thereto. That is, the display module DM may additionally include a separate flexible film for electrically connecting the input sensing layer ISP and the circuit boards PCB.

The display device DD further includes housing EDC for accommodating the display module DM. The housing EDC may be coupled with the window WM to define the exterior appearance of the display device DD. The housing EDC may absorb external shocks and may prevent a foreign material/moisture or the like from being infiltrated into the display module DM such that components accommodated in the housing EDC are protected. In one or more embodiments, the housing EDC may be provided in the form of a combination of a plurality of accommodating members.

Figure 3:
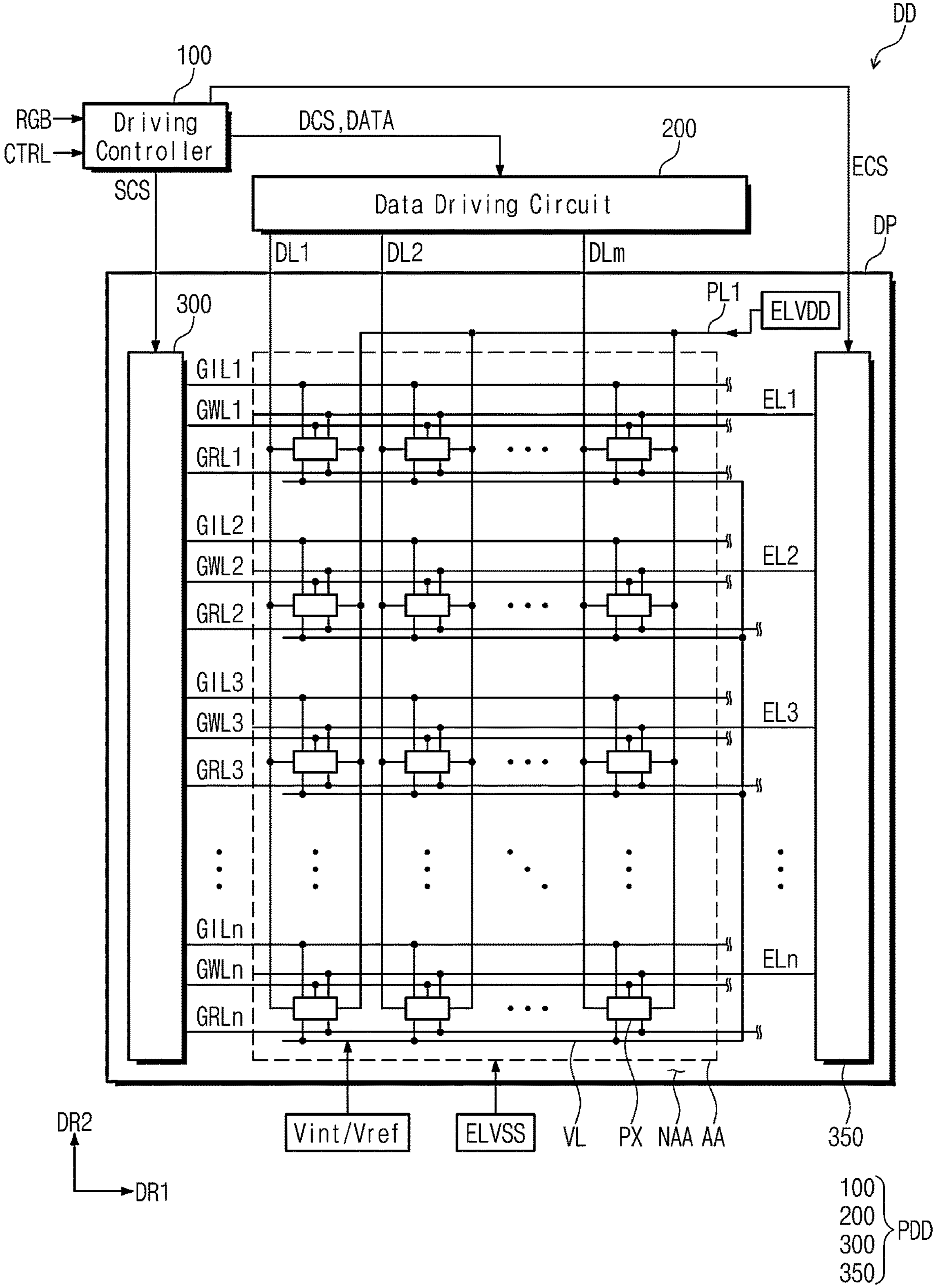
FIG. 3 is a block diagram of an embodiment of a display device according to aspects of the present disclosure.

The display device DD according to an embodiment may further include an electronic module including various functional modules for operating the display module DM, a power supply module (e.g., a battery) for supplying a power for overall operations of the display device DD, a bracket coupled with the display module DM and/or the housing EDC to partition an inner space of the display device DD, and the like FIG. 3 is a block diagram of an embodiment of a display device according to aspects of the present disclosure.

Referring to FIG. 3, a display device DD includes a display panel DP and a panel driver PDD for driving the display panel DP. In one or more embodiments, the panel driver PDD includes a driving controller 100, a data driving circuit 200, a scan driving circuit 300, and an emission driving circuit 350.

The driving controller 100 receives image signals RGB and control signals CTRL. The driving controller 100 generates image data DATA by converting a data format of the image signals RGB in compliance with the specification for interfacing with the data driving circuit 200. The driving controller 100 generates a scan control signal SCS, a data control signal DCS, and an emission control signal ECS, based on the control signals CTRL.

The data driving circuit 200 receives the second driving control signal DCS and the image data DATA from the driving controller 100. The data driving circuit 200 converts the image data DATA into data signals and outputs the data signals to a plurality of data lines DL1 to DLm to be described later. In an embodiment, the data signals are analog data voltages corresponding to greyscale values of the image data DATA.

The scan driving circuit 300 receives the scan control signal SCS from the driving controller 100. The scan control signal SCS may include a start signal for starting an operation of the scan driving circuit 300 and a plurality of clock signals, and other signals supportive of operations of the display device DD. The scan driving circuit 300 may generate a plurality of scan signals and sequentially output the plurality of scan signals GWL1 to GWLn, GRL1 to GRLn, and GIL1 to GILn to scan lines to be described later, in response to the scan control signal SCS. The emission driving circuit 350 may output emission driving signals to emission signal lines EL1 to ELn to be described later, in response to the emission control signal ECS from the driving controller 100. In an embodiment, the scan driving circuit 300 and the emission driving circuit 350 may be integrated into one circuit.

The display panel DP includes a plurality of scan lines GWL1 to GWLn, GRL1 to GRLn, and GIL1 to GILn, a plurality of emission signal lines EL1 to ELn, a plurality of data lines DL1 to DLm, and a plurality of pixels PX. The plurality of scan lines GWL1 to GWLn, GRL1 to GRLn, and GIL1 to GILn extend in the first direction DR1 and are arranged in the second direction DR2 perpendicular to the first direction DR1. Each of the plurality of emission signal lines EL1 to ELn is arranged in parallel with a corresponding scan line among the plurality of scan lines GWL1 to GWLn, GRL1 to GRLn, and GIL1 to GILn. The data lines DL1 to DLm are insulated from and cross the plurality of scan lines GWL1 to GWLn, GRL1 to GRLn, and GIL1 to GILn.

Each of the plurality of pixels PX are connected to a corresponding scan line among the plurality of scan lines GWL1 to GWLn, GRL1 to GRLn, and GIL1 to GILn, a corresponding emission signal line among the plurality of emission signal lines EL1 to ELn, and a corresponding data line among the plurality of data lines DL1 to DLm.

Among the plurality of scan lines GWL1 to GWLn, GRL1 to GRLn, and GIL1 to GILn, scan lines GWL1 to GWLn are of a first group may be referred to as write scan lines. Among the plurality of scan lines GWL1 to GWLn, GRL1 to GRLn, and GIL1 to GILn, scan lines GRL1 to GRLn are of a second group may be referred to as reference scan lines. Among the plurality of scan lines GWL1 to GWLn, GRL1 to GRLn, and GIL1 to GILn, scan lines GIL1 to GILn are of a third group may be referred to as initialization scan lines.

The display panel DP receives a first power supply voltage ELVDD and a second power supply voltage ELVSS. The first power supply voltage ELVDD may be provided to the plurality of pixels PX through a first power supply line PL1. The second power supply voltage ELVSS may be provided to the plurality of pixels PX through a second power supply line PL2 (see FIG. 4A) formed in the display panel DP.

The display panel DP further receives an initialization voltage Vint and a reference voltage Vref. The initialization voltage Vint and the reference voltage Vref may be provided to the plurality of pixels PX through a voltage line VL.

The scan driving circuit 300 and the emission driving circuit 350 may be embedded in the non-active area NAA of the display panel DP. In an example, when the scan driving circuit 300 and the emission driving circuit 350 are embedded in the display panel DP, the scan driving circuit 300 and the emission driving circuit 350 may include transistors which are formed through the same process as a pixel circuit unit PXC (see FIG. 4A) of each pixel PX disposed in the active area AA.

FIG. 3 illustrates an example structure in which the scan driving circuit 300 and the emission driving circuit 350 are disposed adjacent to the left and right sides of the active area AA, respectively, but the present invention is not limited thereto. For example, the display device DD may include one (and omit the other) of the scan driving circuit 300 and the emission driving circuit 350.

The display device DD may operate in a normal frequency mode (also referred to herein as a first mode) in which a driving frequency is fixed (i.e., not variable) or a variable frequency mode (also referred to herein as a second mode) in which the driving frequency is variable. In the variable frequency mode, the driving frequency may be varied according to a frame rate. The panel driver PDD may drive the display panel DP to operate in the normal frequency mode or the variable frequency mode.

Figure 4A:
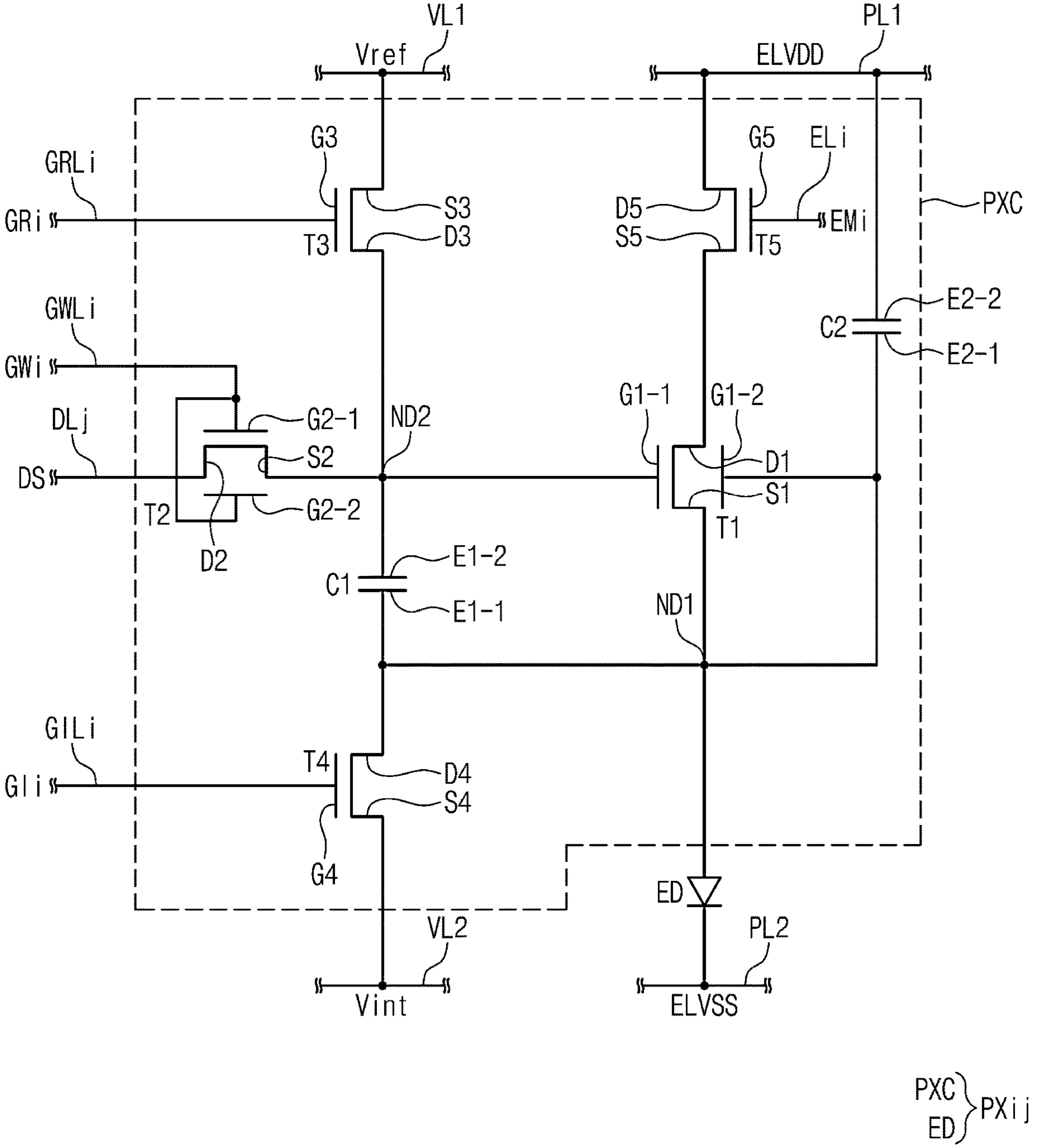
FIG. 4A is a circuit diagram of an embodiment of a pixel according to aspects of the present disclosure.
Figure 4B:
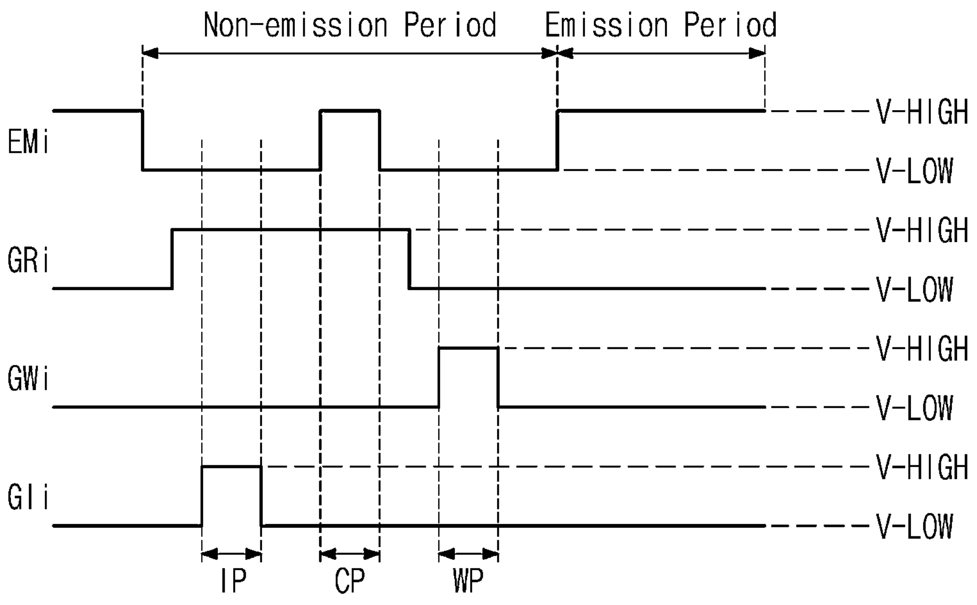
FIG. 4B is a waveform diagram of scan signals and an emission driving signal for driving a pixel illustrated in FIG. 4A.

FIG. 4A is a circuit diagram of an embodiment of a pixel according to aspects of the present disclosure, and FIG. 4B is a waveform diagram of scan signals and an emission driving signal for driving the pixel illustrated in FIG. 4A. Each of the plurality of pixels PX described herein (e.g., with reference to FIG. 3) has the same circuit structure as the circuit structure of a pixel PXij described with reference to FIG. 4A, and thus a detailed description of the remaining pixels will be omitted.

One pixel PXij is representatively shown in FIG. 4A, and the pixel PXij is connected to an i-th write scan line GWLi among the write scan lines GWL1 to GWLn (refer to FIG. 3) and a j-th data line DLj among the data lines DL1 to DLm (refer to FIG. 3). The pixel PXij is connected with an i-th reference scan line GRLi among the reference scan lines GRL1 to GRLn (refer to FIG. 3) and is connected with an i-th initialization scan line GILi among the initialization scan lines GIL1 to GILn (refer to FIG. 3).

The pixel PXij may include a pixel circuit unit (also referred to herein as a pixel driving circuit) PXC and a light emitting element ED electrically connected with the pixel circuit unit PXC. In an embodiment, the pixel circuit unit PXC may include five transistors (hereinafter referred to as "first to fifth pixel transistors") T1 to T5 and two capacitors (hereinafter referred to as a "first capacitor" and a "second capacitor") C1 and C2. In an embodiment, the first to fifth pixel transistors T1 to T5 may be implemented as a first-type (e.g., N-type) of transistor. In an embodiment of the present invention, the pixel PXij may omit at least one of the first to fifth pixel transistors T1 to T5 or may further include an additional pixel transistor.

An embodiment in which each of the first and second pixel transistors T1 and T2 includes two gates (e.g., a top gate and a bottom gate) is illustrated, but at least one of the first and second pixel transistors T1 and T2 may include a single gate (e.g., a top gate or a bottom gate). In the example of FIG. 4A, a structure in which a top gate G2-1 and a bottom gate G2-2 of the second pixel transistor T2 are electrically connected with each other is illustrated, but the present invention is not limited thereto. The bottom gate G2-2 of the second pixel transistor T2 may be a floating gate. A bottom gate G1-2 of the first pixel transistor T1 may be electrically connected with a source S1 of the first pixel transistor T1, and the bottom gate G2-2 of the second pixel transistor T2 may be electrically isolated from a source S2 of the second pixel transistor T2.

In an embodiment, the first pixel transistor T1 may be referred to as a "driving transistor", and the second pixel transistor T2 may be referred to as a "switching transistor". A connection node associated with the first pixel transistor T1 and the light emitting element ED may be referred to as a "first node ND1", and a connection node associated with the first pixel transistor T1 and the second pixel transistor T2 may be referred to as a "second node ND2".

The light emitting element ED includes a first electrode electrically connected with the first node ND1, a second electrode connected with the second power supply line PL2 receiving the second power supply voltage ELVSS, and an emission layer disposed between the first electrode and the second electrode.

The first pixel transistor T1 is electrically connected between the first power supply line PL1 receiving the first power supply voltage ELVDD and the first node ND1. The first pixel transistor T1 may include a source (hereinafter referred to as a "first source") S1 connected with the first node ND1, a drain (hereinafter referred to as a "first drain") D1, a semiconductor region, and a top gate (hereinafter referred to as a "first top gate") G1-1 electrically connected with the second node ND2. The first pixel transistor T1 may further include the bottom gate (hereinafter referred to as a "first bottom gate") G1-2 connected with the first node ND1.

The second pixel transistor T2 is electrically connected between the j-th data line DLj and the second node ND2. The second pixel transistor T2 may include a source (hereinafter referred to as a "second source") S2 connected with the second node ND2, a drain (hereinafter referred to as a "second drain") D2 connected with the j-th data line DLj, a semiconductor region, and a top gate (hereinafter referred to as a "second top gate") G2-1 connected with the i-th write scan line GWLi. The second pixel transistor T2 may further include a bottom gate (hereinafter referred to as a "second bottom gate") G2-2 electrically connected with the second top gate G2-1.

The third pixel transistor T3 is electrically connected between the second node ND2 and a first voltage line VL1 receiving the reference voltage Vref. The third pixel transistor T3 may include a drain (hereinafter referred to as a "third drain") D3 connected with the second node ND2, a source (hereinafter referred to as a "third source") S3 connected with the first voltage line VL1, a semiconductor region, and a top gate (hereinafter referred to as a "third top gate") G3 connected with the i-th reference scan line GRLi. In one or more embodiments, the third pixel transistor T3 may further include a bottom gate (or a third bottom gate) (not illustrated) electrically connected with the third top gate G3.

The fourth pixel transistor T4 is electrically connected between a second voltage line VL2 receiving the initialization voltage Vint and the first node ND1. The fourth pixel transistor T4 may include a drain (hereinafter referred to as a "fourth drain") D4 connected with the first node ND1, a source (hereinafter referred to as a "fourth source") S4 connected with the second voltage line VL2, a semiconductor region, and a top gate (hereinafter referred to as a "fourth top gate") G4 connected with the i-th initialization scan line GILi. The fourth pixel transistor T4 may further include a bottom gate (or a fourth bottom gate) (not illustrated) electrically connected with the fourth top gate G4.

The fifth pixel transistor T5 is electrically connected between the first power supply line PL1 and the first drain D1. In an embodiment, the fifth pixel transistor T5 may include a source (hereinafter referred to as a "fifth source") S5 connected with the first drain D1, a drain (hereinafter referred to as a "fifth drain") D5 connected with the first power supply line PL1, a semiconductor region, and a top gate (hereinafter referred to as a "fifth top gate") G5 connected with the i-th emission signal line ELi. The fifth pixel transistor T5 may further include a bottom gate (or a fifth bottom gate) (not illustrated) electrically connected with the fifth top gate G5.

The first capacitor C1 is electrically connected between the first node ND1 and the second node ND2. The first capacitor C1 includes a first electrode E1-1 connected with the first node ND1 and a second electrode E1-2 connected with the second node ND2.

The second capacitor C2 is electrically connected between the first power supply line PL1 and the first node ND1. The second capacitor C2 includes a first electrode E2-1 connected with the first node ND1 and a second electrode E2-2 connected with the first power line PL1.

An operation of the pixel PXij will be described in detail with reference to FIGS. 4A and 4B. The display device DD (refer to FIG. 3) displays an image every frame period. The write scan lines GWL1 to GWLn, the reference scan lines GRL1 to GRLn, and the initialization scan lines GIL1 to GILn sequentially receive scan signals during the frame period, and the emission signal lines EL1 to ELn sequentially receive emission driving signals during the frame period. FIG. 4B shows a portion of the frame period.

Referring to FIGS. 4A and 4B, each of scan signals GRi, GWi, and GIi and an emission driving signal EMi may have a high voltage V-HIGH (or a "high" level) during some periods and may have a low voltage V-LOW (or a "low" level) during some periods. Each of the first to fifth pixel transistors T1 to T5 being N-type transistors as described above is turned on when a corresponding scan signal or the emission driving signal EMi has the high voltage V-HIGH.

The emission driving signal EMi includes an emission period and a non-emission period. The non-emission period may overlap an initialization period IP, a compensation period CP and a write period WP. During the initialization period IP, the third pixel transistor T3 and the fourth pixel transistor T4 are turned on. During the initialization period IP, the second node ND2 is initialized with the reference voltage Vref, and the first node ND1 is initialized with the initialization voltage Vint. The first capacitor C1 is initialized with a voltage equal to a difference between the reference voltage Vref and the initialization voltage Vint. The second capacitor C2 is initialized with a voltage equal to a difference between the first power supply voltage ELVDD and the initialization voltage Vint.

During the compensation period CP, the third pixel transistor T3 and the fifth pixel transistor T5 are turned on. A threshold voltage of the first pixel transistor T1 may be compensated by a coupling of the first capacitor C1.

During the write period WP, the second pixel transistor T2 is turned on. The second pixel transistor T2 outputs a voltage corresponding to a data signal DS. As a result, a voltage having a voltage value corresponding to the data signal DS is charged in the first capacitor C1. The data signal DS that experiences the compensation for the threshold voltage of the first pixel transistor T1 is charged in the first capacitor C1. In some embodiments, respective threshold voltages of first pixel transistors T1 of the pixels PX (refer to FIG. 3) may be different. However, the pixel PXij illustrated in FIGS. 4A and 4B may supply a current to the light emitting element ED, in which the magnitude of the current is proportional to the data signal DS, regardless of differences between the respective threshold voltages of the first pixel transistors T1.

Afterwards, during the emission period, the fifth pixel transistor T5 is turned on. The first pixel transistor T1 provides a current corresponding to the voltage value stored in the first capacitor C1 to the light emitting element ED. The light emitting element ED may emit a light with luminance corresponding to the data signal DS.

Figure 5:
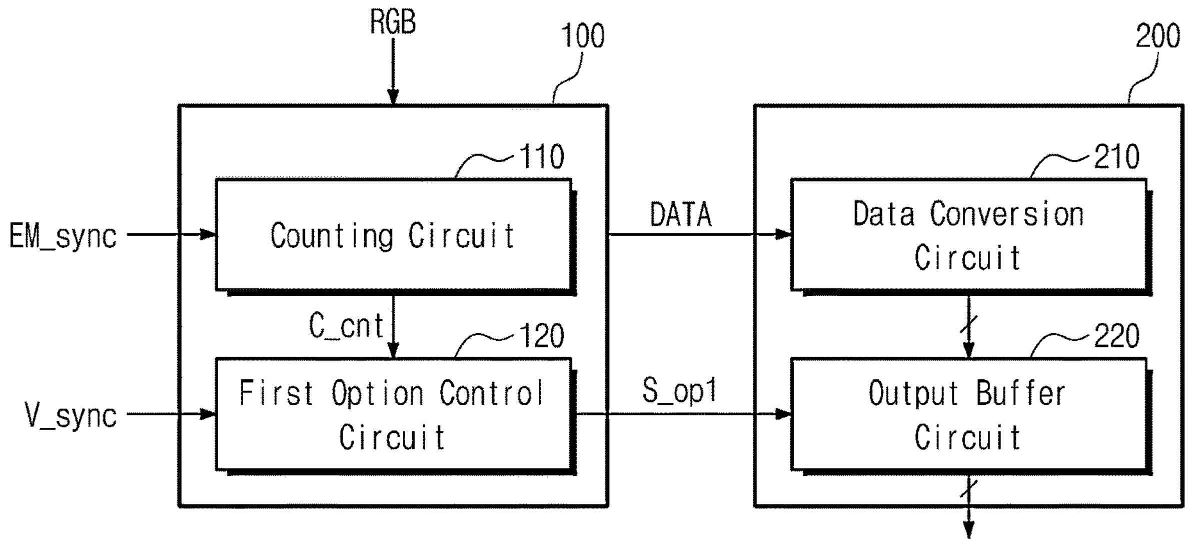
FIG. 5 is a block diagram of an embodiment of a driving controller and a data driving circuit according to aspects of the present disclosure.
Figure 6:
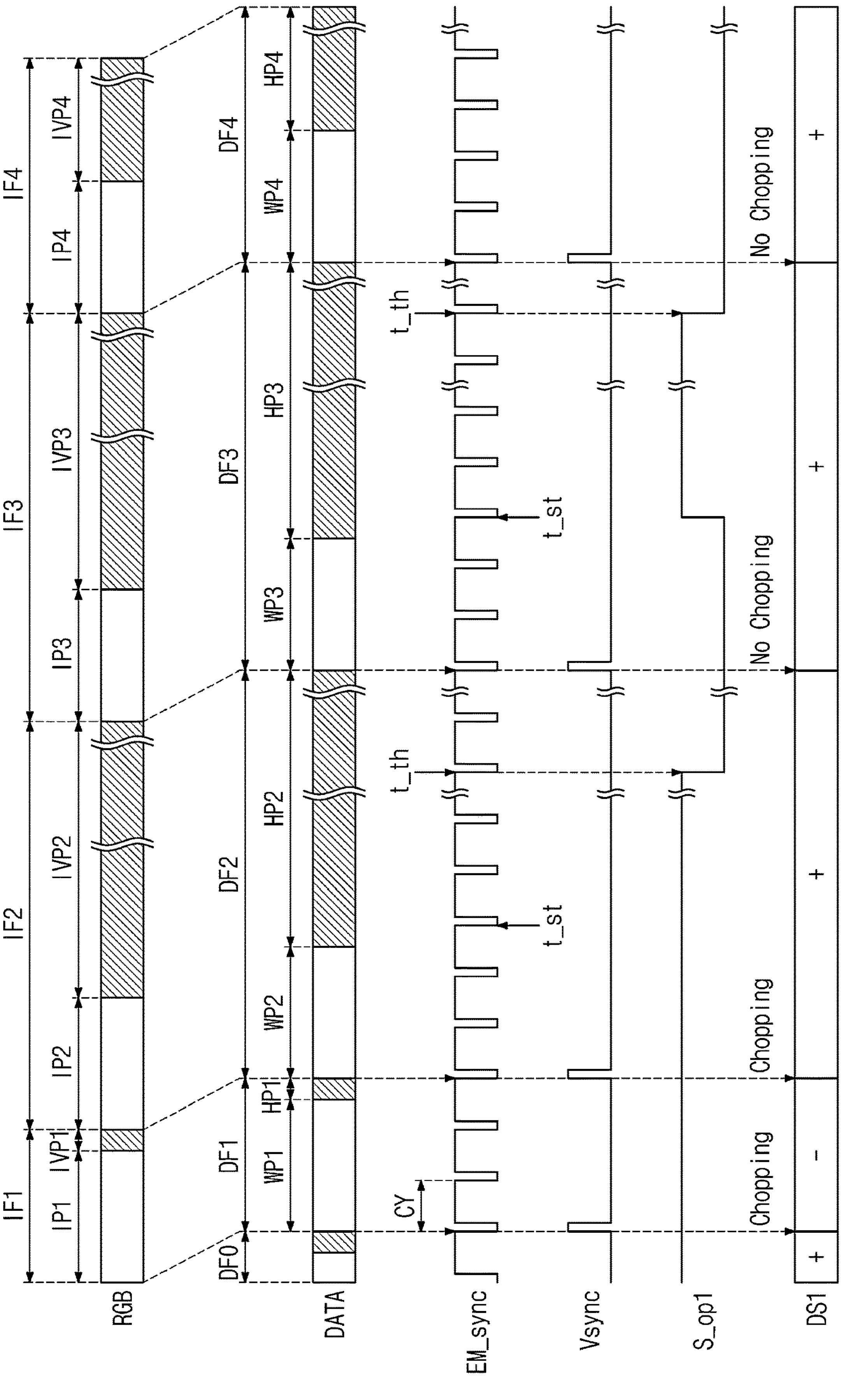
FIG. 6 is a timing diagram for illustrating an embodiment of an operation of a display device in a second mode according to aspects of the present disclosure.
Figure 7:
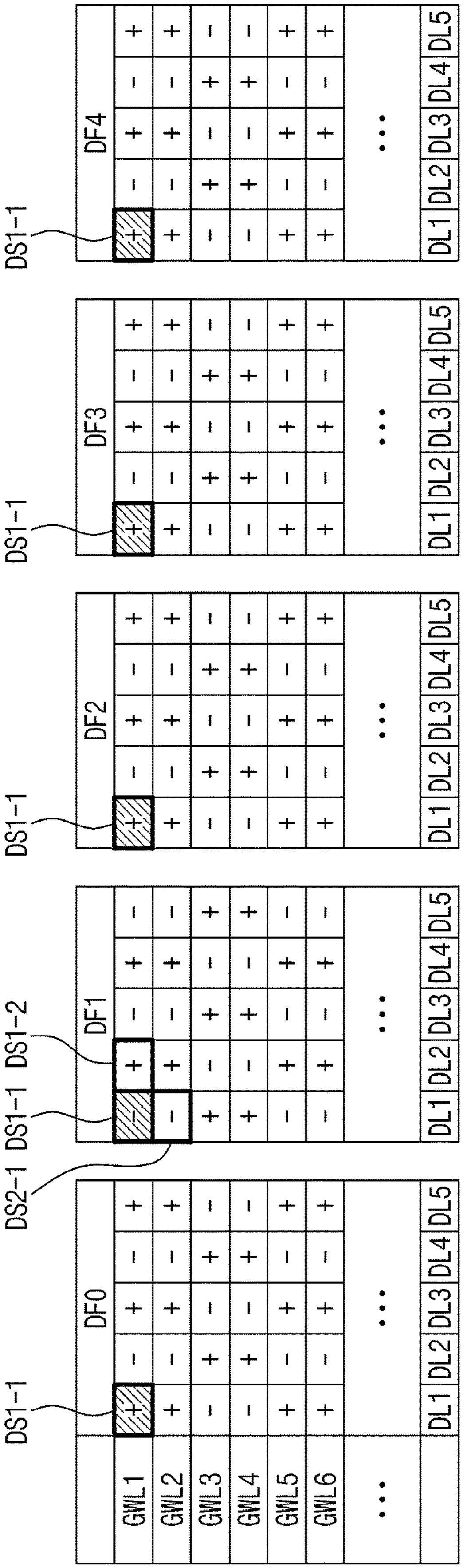
FIG. 7 is a block diagram illustrating an embodiment of a frame inversion operation of a display device in a second mode according to aspects of the present disclosure.

FIG. 5 is a block diagram of an embodiment of a driving controller and a data driving circuit according to aspects of the present disclosure. FIG. 6 is a timing diagram for illustrating an embodiment of an operation of a display device in a second mode according to aspects of the present disclosure. FIG. 7 is a block diagram illustrating an embodiment of a frame inversion operation of a display device in a second mode according to aspects of the present disclosure.

Referring to FIGS. 5 and 6, the driving controller 100 receives the image signals RGB and the control signals CTRL (refer to FIG. 3) from a host processor. The host processor may be a graphic processing unit (GPU). The driving controller 100 converts the image signals RGB to generate the image data DATA and provides the image data DATA to the data driving circuit 200.

The driving controller 100 may support the variable frequency mode. In an example, the host processor provides the image signals RGB at a variable frame rate to the driving controller 100 by changing durations of blank periods IVP1 to IVP4 for every input frame. The driving controller 100 supporting the variable frequency mode synchronizes with the variable frame rate and provides the image data DATA to the panel driver PDD (in particular, the data driving circuit 200), such that the image is displayed at the variable frame rate.

In the examples described herein, periods in which the driving controller 100 receives the image signals RGB may be defined as input frames IF1, IF2, IF3, and IF4, and periods in which the driving controller 100 outputs the image data DATA may be defined as driving frames DF0, DF1, DF2, DF3, and DF4. In the variable frequency mode, an input frequency of the image signals RGB may be varied. In one or more embodiments, a first input frame IF1 may have a first input frequency (e.g., about 120 Hz) and a second input frame IF2 may have a second input frequency (e.g., about 1 Hz) lower than the first input frequency. A third input frame IF3 may have a third input frequency (e.g., about 1 Hz) equal to the second input frequency, and a fourth input frame IF4 may have a fourth input frequency (e.g., about 60 Hz) higher than the third frequency. According to one or more embodiments of the present disclosure, the first to fourth input frames IF1, IF2, IF3, and IF4 may have the same duration or different durations.

The first input frame IF1 includes a first input section IP1 and a first input blank section IVP1, and the second input frame IF2 includes a second input section IP2 and a second input blank section IVP2. The third input frame IF3 includes a third input section IP3 and a third input blank section IVP3, and the fourth input frame IF4 includes a fourth input section IP4 and a fourth input blank section IVP4. The durations of the first to fourth input sections IP1, IP2, IP3, and IP4 may be equal to one another, and the durations of the first to fourth input blank sections IVP1, IVP2, IVP3, and IVP4 may be equal to or different from one another.

In one or more embodiments, in the variable frequency mode, the driving frequencies of the driving frames DF1, DF2, DF3 and DF4 may respectively be equal to the input frequencies of the input frames IF1, IF2, IF3, IF4. In particular, a first driving frequency of a first driving frame DF1 is equal to the first input frequency of the first input frame IF1, and a second driving frequency of a second driving frame DF2 is equal to the second input frequency of the second input frame IF2. A third driving frequency of a third driving frame DF3 is equal to the third input frequency of the third input frame IF3, and a fourth driving frequency of a fourth driving frame DF4 is equal to the fourth input frequency of the fourth input frame IF4.

Each of the driving frames DF1 to DF4 may include a write section. In particular, the first driving frame DF1 includes a first write section WP1, and the second driving frame DF2 includes a second write section WP2. The third driving frame DF3 includes a third write section WP3, and the fourth driving frame DF4 includes a fourth write section WP4. In the variable frequency mode, even if the frequencies of the first to fourth driving frames DF1 to DF4 are different from each other, the durations of the first to fourth write sections WP1 to WP4 may be equal to one other. Each of the first to fourth write sections WP1 to WP4 may be a section (e.g., temporal duration) in which the image data DATA is output from the driving controller 100.

Each of the driving frames DF1 to DF4 may further include a variable holding section. That is, the first driving frame DF1 further include a first variable holding section HP1, and the second driving frame DF2 further include a second variable holding section HP2. The third driving frame DF3 further include a third variable holding section HP3, and the fourth driving frame DF4 further include a fourth variable holding section HP4. In one or more embodiments, respective durations of the first to fourth variable holding sections HP1 to HP4 may be equal to or different from one another. That is, the durations of the first to fourth variable holding sections HP1 to HP4 may be varied according to the driving frequency of each of the first to fourth driving frames DF1 to DF4. During the first to fourth variable holding sections HP1 to HP4, the driving controller 100 may refrain from outputting image data DATA (e.g., the driving controller 100 does not output the image data DATA). In an example, during the first to fourth variable holding sections HP1 to HP4, the driving controller 100 may hold or buffer the image data DATA which was output during the first to fourth write sections WP1 to WP4.

In one or more embodiments, the driving controller 100 receives a vertical synchronization signal V_sync as the control signals CTRL. The vertical synchronization signal V_sync may be a signal determining a start time point of each of the driving frames DF1 to DF4. The driving controller 100 may further receive an emission synchronization signal EM_sync as the control signals CTRL. The emission synchronization signal EM_sync may be a signal determining a start time point of an operating cycle of the emission driving circuit 350 (refer to FIG. 3). The emission synchronization signal EM_sync may be activated for each operation cycle CY. Although FIG. 5 illustrates an example structure of the driving controller 100 for receiving the emission synchronization signal EM_sync from an external device, the present invention is not limited thereto. For example, in one or more alternative embodiments, the driving controller 100 may generate the emission synchronization signal EM_sync based on the vertical synchronization signal V_sync and frequency information of the emission driving circuit 350.

In one or more embodiments, the driving controller 100 may include a counting circuit 110 and a first option control circuit 120. The counting circuit 110 may receive the emission synchronization signal EM_sync and count the operation cycle CY of the emission driving circuit 350 based on the emission synchronization signal EM_sync in the variable frequency mode. The counting circuit 110 may count the operation cycles CY of the emission driving circuit 350 and output a resultant value (i.e., a count value C_cnt).

In one or more embodiments, the counting circuit 110 may receive the vertical synchronization signal V_sync determining the start time point of each of the driving frames DF1 to DF4. The counting circuit 110 may start a counting operation at a time point (i.e., a counting start time point t_st) at which a predetermined amount of time has elapsed from the start time point of each driving frame DF1, DF2, DF3 or DF4. In an embodiment, the counting start time point t_st may be a time point at which a fourth operation cycle starts from the start time point of each driving frame DF1, DF2, DF3 or DF4, but the present invention is not limited thereto. For example, in one or more additional and/or alternative embodiments, the counting circuit 110 may start the counting operation at the start time point of each driving frame DF1, DF2, DF3 or DF4.

In one or more embodiments, the counting circuit 110 may increase the count value C_cnt (also referred to herein as a counting value) of the operation cycle CY by one at a time point associated with the fall of the emission synchronization signal EM_sync (e.g., the transition of the emission synchronization signal EM_sync to a "low" state) from the counting start time point t_st. When a next driving frame starts, the count value C_cnt may be reset.

In an example, the first driving frame DF1 may have a driving frequency of about 120 Hz, the emission synchronization signal EM_sync may have a frequency of about 480 Hz, and 4 operation cycles CY are included in the first driving frame DF1. In another example, the second driving frame DF2 may have a driving frequency of about 1 Hz and the emission synchronization signal EM_sync may have a frequency of about 480 Hz, and 480 operation cycles CY are included in the second driving frame DF2. When the counting start time point t_st is the start time point of the fourth operation cycle, the count value C_cnt may increase to 476 (i.e., "480−4") during the second driving frame DF2.

The first option control circuit 120 may receive the count value C_cnt from the counting circuit 110. The first option control circuit 120 may compare the count value C_cnt with a preset first threshold value R1_th (refer to S110 of FIG. 11). In an example, when the count value C_cnt is greater than the first threshold value R1_th, the first option control circuit 120 may provide a first option signal S_op1 (e.g., set to an inactive state) to the output buffer circuit 220. Expressed another way, the first option control circuit 120 may deactivate the first option signal S_op1. The first option signal S_op1 may be a signal based on which the data driving circuit 200 may determine whether to activate or deactivate a chopping operation.

In one or more embodiments, when the emission synchronization signal EM_sync has a frequency of about 480 Hz, if a first reference frequency for deactivating the chopping operation is set to about 10 Hz, the first threshold value R1_th may be 44 (i.e., "48−4"). For example, the first threshold value R1_th may be calculated by dividing the frequency (e.g., 480 Hz) of emission synchronization signal EM_sync by the first reference frequency (e.g., 10 Hz) and subtracting the quantity (e.g., four) of operation cycles. Alternatively, when the emission synchronization signal EM_sync has a frequency of about 720 Hz, the count start time point t_st may be a start time point of a sixth operation cycle. If the first reference frequency for deactivating the chopping operation is set to about 10 Hz, the first threshold value R1_th may be 66 (i.e., "72×6").

The first option control circuit 120 may set the first option signal S_op1 to the inactive state at a time point (i.e., a threshold time point t_th) when the count value C_cnt exceeds the first threshold value R1_th. In one or more embodiments, a state in which the first option signal S_op1 is "high" (e.g., has a logic value "1") may be defined as an active state (also referred to herein as an activated state) or an "on" state, and a state in which the first option signal S_op1 is "low" (e.g., has a logic value "0") may be defined as an inactive state (also referred to herein as a deactivated state) or an "off" state. Descriptions of deactivating the first option signal S_op1 include setting the first option signal S_op1 to the inactive state, and descriptions of activating the first option signal S_op1 include setting the first option signal S_op1 to the active state. The first option control circuit 120 may maintain the first option signal S_op1 in the active state before the count value C_cnt exceeds the first threshold value R1_th.

The data driving circuit 200 may include a data conversion circuit 210 and an output buffer circuit 220. The data conversion circuit 210 may convert the image data DATA received from the driving controller 100 into data signals. In one or more embodiments, the data conversion circuit 210 may be a digital-to-analog conversion circuit that converts the image data DATA of a digital form into data signals of an analog form. The data signals may be analog voltages.

The output buffer circuit 220 may receive the first option signal S_op1 from the driving controller 100 and perform an inversion operation in response to the first option signal S_op1, in which the output buffer circuit 220 inverts polarities of the data signals generated by the data conversion circuit 210. When the driving frame starts while the first option signal S_op1 is in the active state, the output buffer circuit 220 performs the inversion operation (i.e., a frame inversion operation) of inverting the polarities of the data signals in units of one driving frame (e.g., per driving frame). When the driving frame starts while the first option signal S_op1 is in the inactive state, the output buffer circuit 220 may refrain from performing the frame inversion operation and may maintain polarities of the data signals from a previous driving frame.

Referring FIGS. 6 and 7, since the first option signal S_op1 is in the active state at the start time point of the first driving frame DF1, the data driving circuit 200 performs the frame inversion operation such that a polarity of a first-first data signal DS1-1 is inverted from a positive polarity to a negative polarity. For example, at the start time point of the first driving frame DF1, the first-first data signal DS1-1 is applied to a pixel that is connected to a first data line DL1 and a first write scan line GWL1, and the polarity of a first-first data signal DS1-1 is inverted from the positive polarity to the negative polarity. A first-second data signal DS1-2 is applied to a pixel that is connected to a second data line DL2 and the first write scan line GWL1, and a polarity of the first-second data signal DS1-2 is inverted from the negative polarity to the positive polarity. Further, for example, at the start time point of the first driving frame DF1, a second-first data signal DS2-1 of a negative polarity is applied to a pixel that is connected to the first data line DL1, and a second write scan line GWL2 is inverted from the positive polarity to the negative polarity.

As such, for example, the polarities of the data signals may be inverted in units of 2×1 (e.g., DS1-1 and DS1-2, DS1-1 and DS2-1, or the like) within one driving frame. Aspects of the polarity inversion form of the data signals within one driving frame are not limited to the examples described herein. Expressed another way, the units in which the polarities of the data signals may be inverted are not limited to the examples described herein. For example, the polarity inversion form of the data signals may be variously modified such as, for example, 3×1, 3×2, and the like within one driving frame. Although FIG. 7 shows 5 data lines DL1 to DL5 and 6 write scan lines GWL1 to GWL6 as an example, aspects of the present disclosure support applying the polarity inversion form described herein to pixels connected to the remaining data lines and the remaining write scan lines.

In an example, since the first option signal S_op1 is still in the active state at the start time point of the second driving frame DF2, the frame inversion operation is performed such that the polarity of the first-first data signal DS1-1 is inverted (e.g., at third driving frame DF3) from the negative polarity to the positive polarity. However, during the second driving frame DF2, the first option signal S_op1 is switched to the inactive state at the threshold time point t_th. Accordingly, for example, since the first option signal S_op1 is in the inactive state at the start time point of the third driving frame DF3, the data driving circuit 200 may refrain from performing the frame inversion operation (no chopping) such that the polarity of the first-first data signal DS1-1 within the third driving frame DF3 is the same as the polarity (i.e., the positive polarity) of the first-first data signal DS1-1 within the second driving frame DF2. Expressed another way, the polarity of the first-first data signal DS1-1 remains unchanged from the second driving frame DF2 to the third driving frame DF3.

The first option signal S_op1 is switched to the active state at the counting start time point t_st of the third driving frame DF3, but is switched back to the inactive state at the threshold time point t_th. Accordingly, the first option signal S_op1 is in the inactive state at the start time point of the fourth driving frame DF4. As a result, for example, even at the start time point of the fourth driving frame DF4, the data driving circuit 200 refrains from performing the frame inversion operation (no chopping) such that the polarity of the first-first data signal DS1-1 within the fourth driving frame DF4 is the same as the polarity (i.e., the positive polarity) of the first-first data signal DS1-1 within the third driving frame DF3. Expressed another way, the polarity of the first-first data signal DS1-1 remains unchanged from the third driving frame DF3 to the fourth driving frame DF4.

In some aspects, when operating in the variable frequency mode (e.g., and alternating between chopping or not chopping) as described herein, by stopping the frame inversion operation below the first reference frequency (e.g., for cases in which emission synchronization signal EM_sync has a frequency below the first reference frequency), the techniques described herein may prevent flicker from otherwise being recognized due to a frame inversion operation below the first reference frequency. That is, for example, the techniques described herein of operating in the variable frequency mode may substantially reduce and/or effectively minimize instances of flicker. Accordingly, for example, the frame inversion operations associated with operating in the variable frequency mode may mitigate problems of deterioration of image quality.

Figure 8:
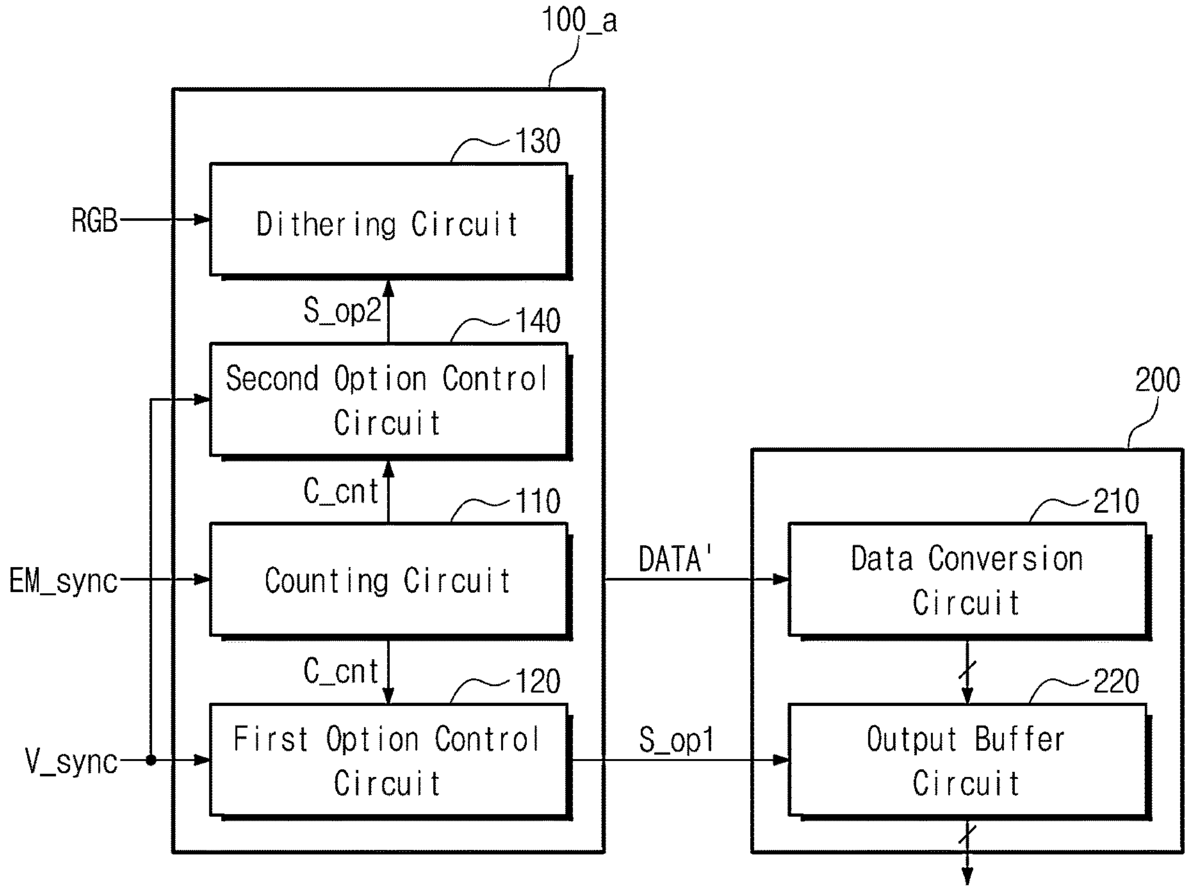
FIG. 8 is a block diagram of an embodiment of a driving controller and a data driving circuit according to aspects of the present disclosure.
Figure 9:
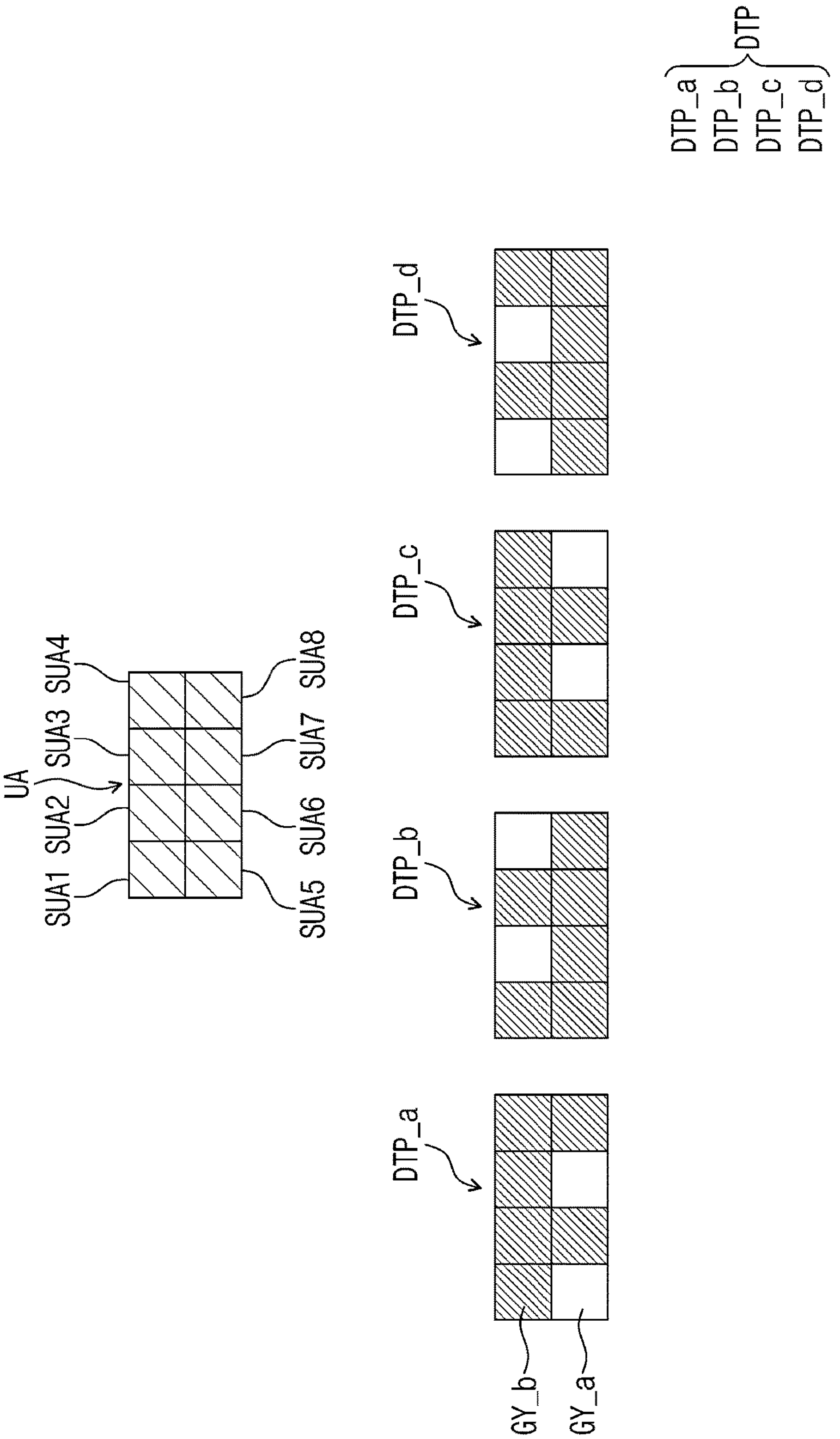
FIGS. 9 and 10 are conceptual diagrams illustrating a dithering operation of a display device in a second mode according to aspects of the present disclosure.
Figure 10:
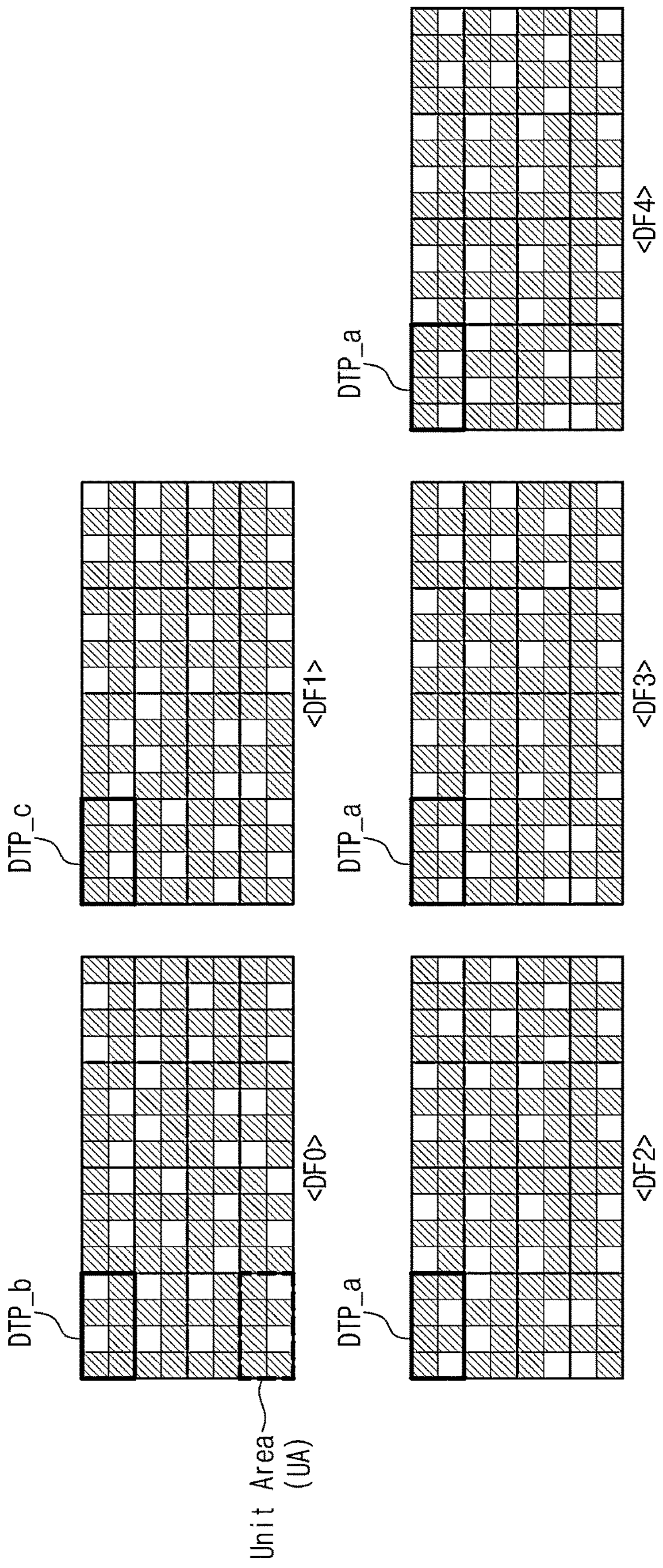

FIG. 8 is a block diagram of an embodiment of a driving controller and a data driving circuit according to aspects of the present disclosure. FIGS. 9 and 10 are conceptual diagrams illustrating an embodiment of a dithering operation of a display device in a second mode according to aspects of the present disclosure. Among components shown in FIG. 8, the same reference numerals are given to components identical to those shown in FIG. 5, and detailed descriptions thereof are omitted.

Referring to FIGS. 6 and 8, the driving controller 100_*a* may include the counting circuit 110, the first option control circuit 120, a dithering circuit 130, and a second option control circuit 140. The counting circuit 110 may count the operation cycles CY of the emission driving circuit 350 (refer to FIG. 3) based on the emission synchronization signal EM_sync in the variable frequency mode. The counting circuit 110 may provide the count value C_cnt to the first and second option control circuits 120 and 140.

In one or more embodiments, the second option control circuit 140 may receive the count value C_cnt from the counting circuit 110. The second option control circuit 140 may compare the count value C_cnt with a preset second threshold value R2_th (refer to S110 of FIG. 11), and when the count value C_cnt is greater than the second threshold value R2_th, the second option control circuit 140 may provide a second option signal S_op2 (e.g., set to an inactive state). Expressed another way, the second option control circuit 140 may deactivate the second option signal S_op2. The second option signal S_op2 may be a signal based on which the dithering circuit 130 may determine whether to activate or deactivate a dithering operation.

In an embodiment of the present invention, when the emission synchronization signal EM_sync has a frequency of about 480 Hz, the count start time point t_st may be a start time point of a fourth operation cycle. If a second reference frequency for deactivating the dithering operation is set to about 30 Hz, the second threshold value R2_th may be 12 (i.e., "16−4"). For example, the second threshold value R2_th may be calculated by dividing the frequency (e.g., 480 Hz) of emission synchronization signal EM_sync by the second reference frequency (e.g., 30 Hz) and subtracting the quantity (e.g., four) of operation cycles Alternatively, when the emission synchronization signal EM_sync has a frequency of about 720 Hz, the count start time point t_st may be the start time point of the sixth operation cycle. In this case, if the second reference frequency for deactivating the dithering operation is set to about 30 Hz, the second threshold value R2_th may be 18 (i.e., "24−6"). In one or more embodiments, the second threshold value R2_th may be equal to the first threshold value R1_th. For example, when the first and second reference frequencies are each equal to about 10 Hz, the second threshold value R2_th may be equal to the first threshold value R1_th.

The second option control circuit 140 may set the second option signal S_op2 to an active state (or, expressed other ways, set the second option signal S_op2 to "high" (e.g., a logic value "1") or activate second option signal S_op2) when the count value C_cnt is less than the second threshold value R2_th. The second option control circuit 140 may set the second option signal S_op2 to an inactive state (or, expressed other ways, set the second option signal S_op2 to "low" (e.g., a logic value "0") or deactivate the second option signal S_op2) at a time point when the count value C_cnt exceeds the second threshold value R2_th.

The dithering circuit 130 may receive the second option signal S_op2 from the second option control circuit 140 and determine whether to activate the dithering operation, based on the second option signal S_op2. That is, when the second option signal S_op2 is in the active state, the dithering circuit 130 may perform the dithering operation, and when the second option signal S_op2 is switched to the inactive state, the dithering circuit 130 may stop or refrain from performing the dithering operation.

Referring to FIGS. 8 to 10, in one or more embodiments, the dithering circuit 130 may receive the image signals RGB and generate compensation image signals by applying a dithering scheme to the image signals RGB. The dithering scheme is an image processing scheme for displaying a predetermined grayscale by using a predetermined quantity of grayscales (e.g., by using a limited quantity of grayscales). The driving controller 100_*a* may convert the compensation image signals into compensation image data DATA' and provide the compensation image data DATA' to the data driving circuit 200.

The dithering pattern DTP is a reference pattern used in association with performing the dithering scheme. In an embodiment of the present invention, the dithering pattern DTP may correspond to a unit area UA (illustrated at FIG. 9) of the display panel (refer to FIG. 3). The dithering pattern DTP may include a plurality of grayscale areas (also referred to herein as grayscale regions). In an embodiment of the present invention, each of the plurality of grayscale areas may correspond to the one pixel PX (refer to FIG. 3). However, the present invention is not limited thereto, each of the plurality of grayscale areas may correspond to a plurality of pixels PX (e.g., two or more pixels PX).

In the example illustrated in FIG. 9, the one unit area UA includes 8 sub-unit areas SUA1 to SUA8 and is arranged in 2×4 array. However, embodiments of the present invention are not limited thereto. For example, a unit area UA of the display panel may include a p×q array of sub-unit areas, in which 'p' and 'q' may be natural numbers greater than or equal to 1.

Each of the plurality of grayscale areas included in the dithering pattern DTP may have a first grayscale value GY_a or a second grayscale value GY_b. In the example, the dithering pattern DTP may have sub-dithering patterns (e.g., sub-dithering pattern DTP_a, sub-dithering pattern DTP_b, and the like) respectively corresponding to sub-unit areas SUA1 to SUA8, and for each sub-dithering pattern, two grayscale areas among the eight grayscale areas each have the first grayscale value GY_a, and six grayscale areas each have the second grayscale value GY_b. The first grayscale value GY_a may be greater than the second grayscale value GY_b. The grayscale of the dithering pattern DTP may be an average grayscale calculated by averaging grayscales of the plurality of grayscale areas and/or by averaging grayscales of the sub-dithering patterns. As the number of grayscale areas having the first grayscale value GY_a in the dithering pattern DTP increases, the grayscale of the dithering pattern DTP increases.

In an embodiment of the present invention, the dithering pattern DTP includes a first sub-dithering pattern DTP_a, a second sub-dithering pattern DTP_b, a third sub-dithering pattern DTP_c, and a fourth sub-dithering pattern DTP_d. Locations of the grayscale areas having the first grayscale value GY_a in each of the first to fourth sub-dithering patterns DTP_a, DTP_b, DTP_c, and DTP_d may be the same or different from each other.

FIG. 10 illustrates an example of 16 unit areas UA defined in the display panel DP, in which an image corresponding to one among the first to fourth sub-dithering patterns DTP_a, DTP_b, DTP_c, and DTP_d may be displayed in each of the 16 unit areas UA. Displaying an image corresponding to one of the first to fourth sub-dithering patterns DTP_a to DTP_d in each of the 16 unit areas UA during each driving frame may be defined as a spatial dithering operation. Sub-dithering patterns corresponding to the 16 unit areas may be varied in units of at least one driving frame. Expressed another way, for a given driving frame, a sub-dithering pattern (e.g., any of sub-dithering pattern DTP_a through first to fourth sub-dithering patterns DTP_a to DTP_d) may be displayed in a unit area UA defined in the display panel DP, and for a subsequent driving frame, the same sub-dithering pattern or a different sub-dithering pattern may be displayed in the unit area UA. Changing the sub-dithering pattern corresponding to each unit area UA in units of the at least one driving frame may be defined as a frame dithering operation.

The dithering circuit 130 may control whether to activate the frame dithering operation based on the second option signal S_op2. In particular, at the start of the first driving frame DF1, the dithering circuit 130 may activate the frame dithering operation. As a result, the sub-dithering patterns displayed in the 16 unit areas UA during the first driving frame DF1 may be different from the sub-dithering patterns displayed in the 16 unit areas during the previous driving frame DF0. In some embodiments, one or more (or all) of the sub-dithering patterns displayed in the 16 unit areas UA during the first driving frame DF1 may be different from the sub-dithering patterns displayed in the 16 unit areas during the previous driving frame DF0. At the start of the second driving frame DF2, if the second option signal S_op2 is in an active state, the dithering circuit 130 may continue to perform the frame dithering operation (e.g., the frame dithering operation may still be active). Thus, one or more (or all) of the sub-dithering patterns displayed in the 16 unit areas UA during the second driving frame DF2 may be different from the sub-dithering patterns displayed in the 16 unit areas during the first driving frame DF1.

In one or more alternative embodiments, at the start of the third driving frame DF3, if the second option signal S_op2 is in an inactive state, the dithering circuit 130 may refrain from performing the frame dithering operation (e.g., the frame dithering operation may be inactive or in a deactivated state). Thus, the sub-dithering patterns displayed in the 16 unit areas UA during the third driving frame DF3 may be the same as the sub-dithering patterns displayed in the 16 unit areas during the second driving frame DF2. Similarly, at the start of the fourth driving frame DF4, if the second option signal S_op2 is still in the inactive state, the sub-dithering patterns displayed in the 16 unit areas UAs during the fourth driving frame DF4 may also be the same as the sub-dithering patterns displayed in the 16 unit areas during the third driving frame DF3.

In some aspects, when operating in the variable frequency mode (e.g., and alternating between dithering or not dithering) as described herein, by deactivating the frame dithering operation below the second reference frequency (e.g., for cases in which emission synchronization signal EM_sync has a frequency below the second reference frequency), the techniques described herein may prevent flicker from otherwise being recognized due to a frame dithering operation below the second reference frequency. That is, for example, the techniques described herein of dithering or not dithering according to the variable frequency mode may substantially reduce and/or effectively minimize instances of flicker. Accordingly, for example, the techniques described herein may mitigate problems of deterioration of image quality due to a frame dithering operation when operating in the variable frequency mode.

Figure 11:
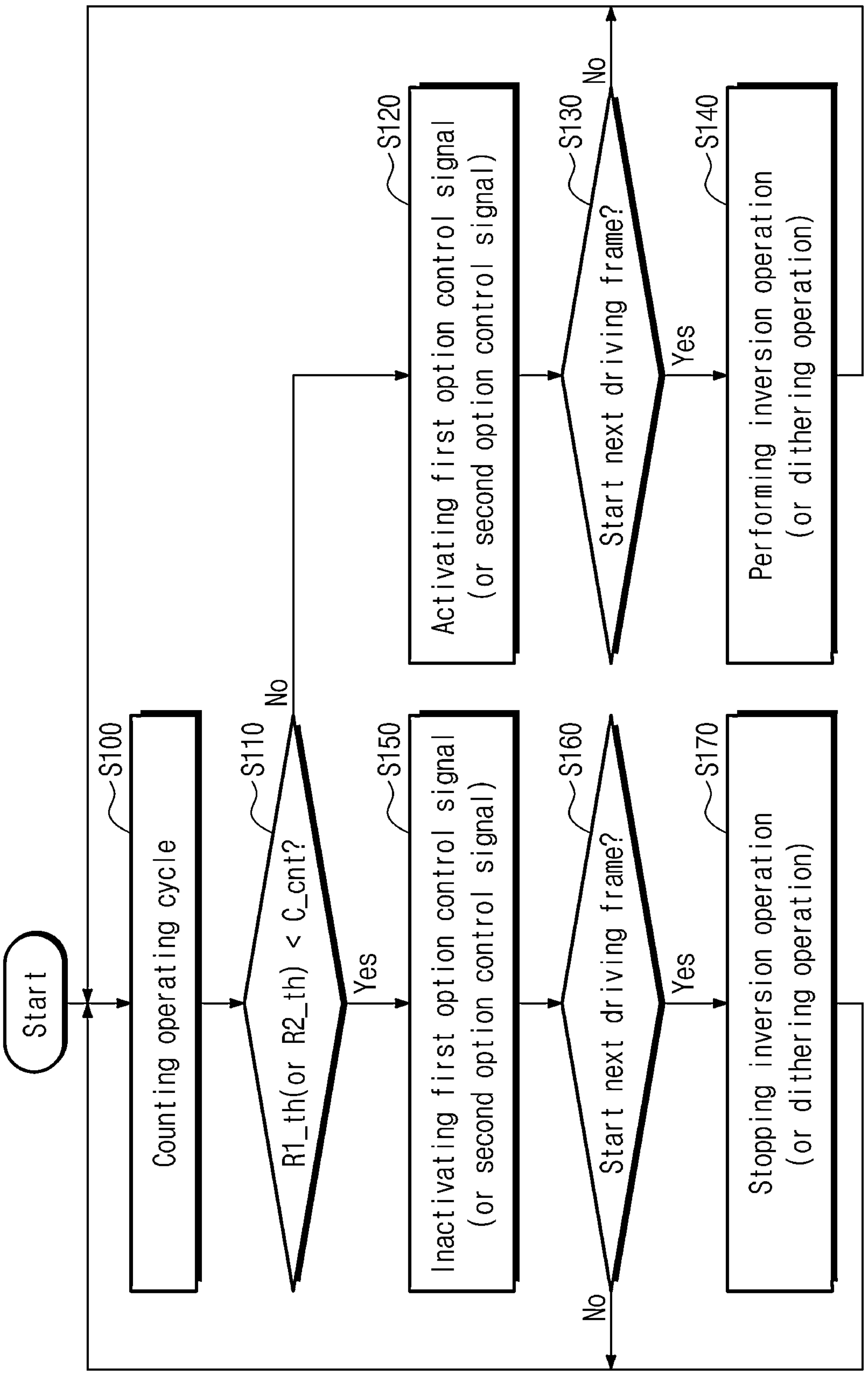
FIG. 11 is a flow chart illustrating an embodiment of an operation of a display device according to aspects of the present disclosure.

FIG. 11 is a flow chart illustrating an embodiment of an operation of a display device according to aspects of the present disclosure.

Referring to FIGS. 5, 8 and 11, the display device DD (refer to FIG. 3) may count the operation cycles of the emission driving circuit 350 (refer to FIG. 3) based on the emission synchronization signal EM_sync to generate the count value C_cnt in the variable frequency mode (S100).

The display device DD may compare the count value C_cnt with the preset first or second threshold value R1_th or R2_th (S110).

In an example, when the count value C_cnt is less than (or in one or more alternative embodiments, equal to or less than) the first or second threshold value R1_th or R2_th, the driving controller 100_*a* may activate the first option signal S_op1 or the second option signal S_op2 (S120). Expressed another way, in some aspects, the driving controller 100_*a* may set the first option signal S_op1 to the active state (e.g., activate the first option signal S_op1) when the count value C_cnt is equal to or less than the first threshold value R1_th, and further, the driving controller 100_*a* may set the second option signal S_op2 to the active state (e.g., activate the second option signal S_op2) when the count value C_cnt is equal to or less than the second threshold value R2_th.

When the first option signal S_op1 or the second option signal S_op2 is in the active state, if a new driving frame (i.e., a next driving frame) starts (S130), the frame inversion operation (i.e., an inversion operation) or the frame dithering operation (i.e., a dithering operation) may be activated (S140). Expressed another way, at S140, the data driving circuit 200 may perform the frame inversion operation and/or the driving controller 100_*a* may perform the frame dithering operation. However, if the new driving frame (i.e., the next driving frame) does not start (S130), moving to step S100, the counting operation may be repeated.

When the count value C_cnt is greater than the first or second threshold value R1_th or R2_th, the first option signal S_op1 or the second option signal S_op2 may be switched to the inactive state (S150). When the first option signal S_op1 or the second option signal S_op2 is in the inactive state, if the new driving frame (i.e., the next driving frame) starts (S160), the frame inversion operation or the frame dithering operation may be deactivated (S170). Expressed another way, at S170, the data driving circuit 200 may stop or refrain from performing the frame inversion operation and/or the driving controller 100_*a* may stop or refrain from performing the frame dithering operation. However, if the new driving frame (i.e., the next driving frame) does not start (S160), moving to step S100, the counting operation may be repeated.

When operating in the variable frequency mode, by deactivating the frame inversion operation or the frame dithering operation below the first or second reference frequency, the techniques described herein may prevent flicker from otherwise being recognized due to a frame inversion operation or a frame dithering operation below the first or second reference frequency.

Figure 12:
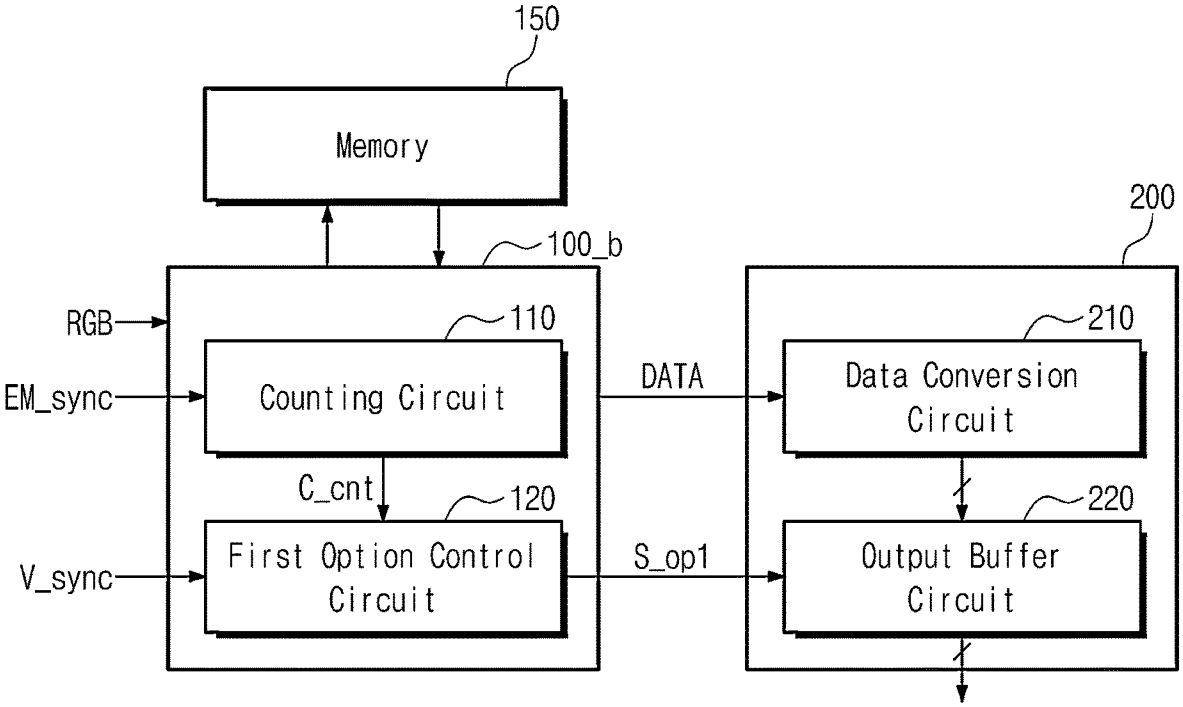
FIG. 12 is a block diagram of an embodiment of a driving controller and a data driving circuit according to aspects of the present disclosure.
Figure 13:
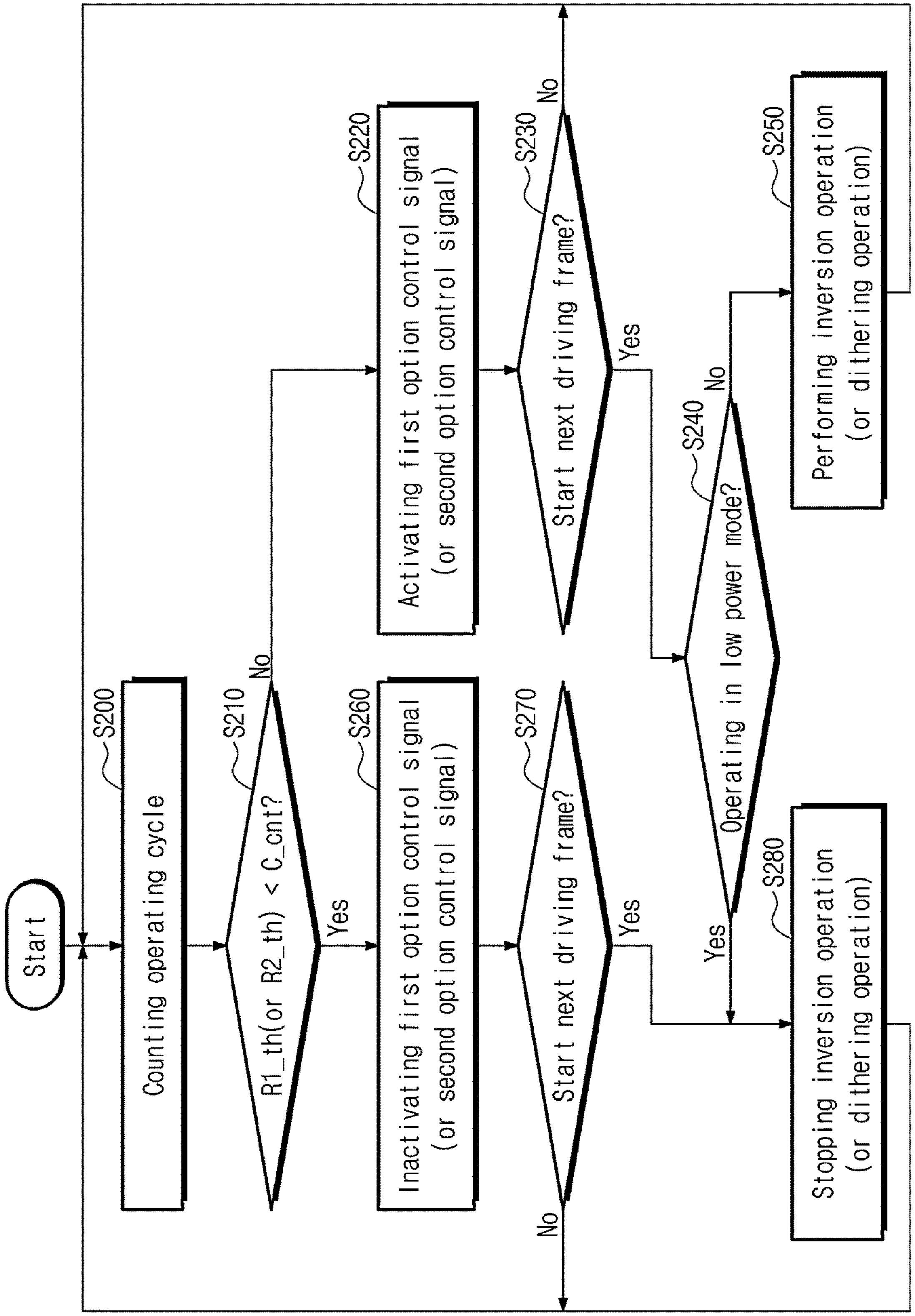
FIG. 13 is a flow chart illustrating an embodiment of an operation of a display device according to aspects of the present disclosure.

FIG. 12 is a block diagram of an embodiment of a driving controller and a data driving circuit according to aspects of the present disclosure. FIG. 13 is a flow chart illustrating an embodiment of an operation of a display device according to aspects of the present disclosure. Among components shown in FIG. 12, the same reference numerals are given to components identical to those shown in FIG. 5, and detailed descriptions thereof are omitted.

Referring to FIG. 12, the display device DD (refer to FIG. 3) may operate in a low power mode. In an example, the display device DD may activate the low power mode to reduce power consumption when a still image that may be implemented without high-speed driving or a text image having a long change cycle is displayed.

In the low power mode, the display device DD may operate at a low driving frequency. When operating in the low power mode, the driving controller 100_*b* may output the image signals RGB received from the host processor during the driving frame and store the image signals RGB in a memory 150. That is, for example, the display device DD may display the still image (or the text image) during the driving frame and repeatedly display the still image (or the text image) during a plurality of holding frames after the driving frame ends. That is, for example, during the plurality of holding frames, the driving controller 100_*b* may output previous image signals RGB stored in the memory 150.

In one or more embodiments, even when operating in the low power mode, by controlling the states (e.g., active states, inactive states) of the first and second option signals S_op1 and S_op2, the techniques described herein may prevent flicker from otherwise being recognized due to a frame inversion operation and/or a frame dithering operation during low frequency driving.

According to one or more embodiments of the present disclosure, the configuration of the driving controller 100_*b* is not limited to the examples described with reference to FIG. 12, and the driving controller 100_*b* may have additional suitable configurations supportive of the techniques described herein. For example, the driving controller 100_*b* may have the configuration described with reference to FIG. 8.

Referring to FIGS. 12 and 13, the display device DD (refer to FIG. 3) may count the operation cycles CY (refer to FIG. 6) of the emission driving circuit 350 (refer to FIG. 3) based on the emission synchronization signal EM_sync to generate the count value C_cnt in the variable frequency mode (S200).

Then, the display device DD may compare the count value C_cnt with the preset first or second threshold value R1_th or R2_th (S210).

In an example, when the count value C_cnt is less than (or in one or more alternative embodiments, equal to or less than) the first or second threshold value R1_th or R2_th, the driving controller 100_*b* may activate the first option signal S_op1 or the second option signal S_op2 (S220). Expressed another way, in some aspects, the driving controller 100_*b* may set the first option signal S_op1 to the active state (e.g., activate the first option signal S_op1) when the count value C_cnt is equal to or less than the first threshold value R1_th, and further, the driving controller 100_*b* may set the second option signal S_op2 to the active state (e.g., activate the second option signal S_op2) when the count value C_cnt is equal to or less than the second threshold value R2_th.

When the first option signal S_op1 or the second option signal S_op2 is in the active state, the display device DD determines whether a next driving frame (or a next holding frame) starts (S230). If a next driving frame (or a holding driving frame) starts, it may be determined whether the display device DD operates in the low power mode (S240). If the display device DD does not operate in the low power mode, the frame inversion operation (i.e., an inversion operation) or the frame dithering operation (i.e., a dithering operation) is activated (S250). Expressed another way, at S250, the data driving circuit 200 may perform the frame inversion operation and/or the driving controller 100_*b* may perform the frame dithering operation. In one or more alternative embodiments, when the display device DD operates in the low power mode, the frame inversion operation or the frame dithering operation is stopped (S280). Expressed another way, at S280, the data driving circuit 200 may stop or refrain from performing the frame inversion operation and/or the driving controller 100_*b* may stop or refrain from performing the frame dithering operation.

When the count value C_cnt is greater than the first or second threshold value R1_th or R2_th, the first option signal S_op1 or the second option signal S_op2 may be switched to the inactive state (S260). When the first option signal S_op1 or the second option signal S_op2 is in the inactive state, the display device DD determines whether the next driving frame (or the next holding frame) starts (S270). If the next driving frame (or the next holding frame) starts, the frame inversion operation or the frame dithering operation may be stopped (S280).

According example embodiments of the present invention, when operating in the variable frequency mode, by deactivating the frame inversion operation or the frame dithering operation below the first or second reference frequency, the techniques described herein may prevent flicker from otherwise being recognized due to a frame inversion operation or a frame dithering operation below the first or second reference frequency. Accordingly, the techniques described herein may mitigate problems of deterioration of image quality due to a frame inversion operation or a frame dithering operation when operating in the variable frequency mode.

Example embodiments in accordance with aspects of the present disclosure have been described for illustrative purposes, and those skilled in the art will appreciate that various modifications, and substitutions are possible, without departing from the scope and spirit of the present invention as disclosed in the accompanying claims. Accordingly, the technical scope of the example aspects of the present invention are not limited to the detailed description of this specification, but should be defined by the claims.

What is claimed is:

1. A display device comprising:
- a display panel which includes a light emitting element and a pixel circuit unit connected to the light emitting element and receiving an emission driving signal; and
- a panel driver which drives the display panel in a first mode in which a driving frequency is fixed or a second mode in which the driving frequency is varied,
- wherein the panel driver comprises:
  - an emission driving circuit which outputs the emission driving signal to the display panel;
  - a data driving circuit which outputs a data signal to the display panel and inverts a polarity of the data signal in units of at least one driving frame in response to a first option signal; and
  - a driving controller which controls operations of the emission driving circuit and the data driving circuit, and
- wherein the driving controller comprises:
  - a counting circuit which counts an operation cycle of the emission driving circuit to output a count value in the second mode; and
  - a first option control circuit which compares the count value with a preset first threshold value and sets the first option signal to an inactive state when the count value is greater than the preset first threshold value.

2. The display device of claim 1, wherein:
- the data driving circuit comprises an output buffer circuit outputting the data signal, and
- the output buffer circuit:
  - performs an inversion operation of inverting the polarity of the data signal in units of the at least one driving frame when the first option signal is in an active state, and
  - stops the inversion operation when the first option signal is in the inactive state.

3. The display device of claim 2, wherein the counting circuit:
- receives a vertical synchronization signal determining a start time point of the at least one driving frame; and
- starts a counting operation at a time point when a predetermined amount of time has elapsed from the start time point.

4. The display device of claim 2, wherein the first option control circuit:
- sets the first option signal to the active state when the count value is equal to or less than the preset first threshold value, and
- sets the first option signal to the inactive state when the count value is greater than the preset first threshold value.

5. The display device of claim 1, wherein the driving controller further comprises:
- a dithering circuit which receives an image signal and generates a compensation image signal by applying a dithering scheme to the image signal; and
- a second option control circuit which compares the count value with a preset second threshold value and sets a second option signal to an inactive state when the count value is greater than the preset second threshold value.

6. The display device of claim 5, wherein the dithering circuit:
- performs a dithering operation for the image signal in units of the at least one driving frame when the second option signal is in an active state, and
- stops the dithering operation when the second option signal is in the inactive state.

7. The display device of claim 6, wherein the counting circuit receives a vertical synchronization signal determining a start time point of the at least one driving frame and start a counting operation at a time point when a predetermined amount of time has elapsed from the start time point.

8. The display device of claim 7, wherein the second option control circuit:
- sets the second option signal to the active state when the count value is equal to or less than the preset second threshold value, and
- sets the second option signal to the inactive state when the count value is greater than the preset second threshold value.

9. The display device of claim 1, wherein:
- the driving frequency is varied in units of the at least one driving frame in the second mode,
- the at least one driving frame comprises a first driving frame having a first driving frequency and a second driving frame having a second driving frequency lower than the first driving frequency, the first driving frame includes a first write section and a first variable holding section, and the second driving frame includes a second write section and a second variable holding section.

10. The display device of claim 9, wherein:

a duration of the second write section is equal to a duration of the first write section, and a duration of the second variable holding section is greater than a duration of the first variable holding section.

11. The display device of claim 10, wherein:

the emission driving circuit is activated in units of the operation cycle, and each of the first write section and the second write section includes at least one operation cycle.

12. The display device of claim 11, wherein a period of the operation cycle is fixed and not varied according to the driving frequency.

13. The display device of claim 1, wherein:

the panel driver further comprises a memory which stores an image signal corresponding to one driving frame when operating in a low power mode, and the driving controller repeatedly outputs the image signal stored in the memory during a holding frame in the low power mode.

14. The display device of claim 13, wherein:

the data driving circuit comprises an output buffer circuit outputting the data signal, and the output buffer circuit:

performs an inversion operation of inverting the polarity of the data signal in units of the one driving frame when the first option signal is in an active state, and stops the inversion operation when the first option signal is in an inactive state.

15. The display device of claim 14, wherein the first option control circuit:

sets the first option signal to the active state when the count value is equal to or less than the preset first threshold value, and sets the first option signal to the inactive state when the count value is greater than the preset first threshold value.

16. The display device of claim 13, wherein the driving controller further comprises:

a dithering circuit which receives the image signal and generates a compensation image signal by applying a dithering scheme to the image signal; and a second option control circuit which compares the count value with a preset second threshold value and deactivates a second option signal when the count value is greater than the preset second threshold value.

17. The display device of claim 16, wherein the dithering circuit:

performs a dithering operation for the image signal in units of the at least one driving frame when the second option signal is in an active state, and stops the dithering operation when the second option signal is in a second inactive state.

18. A driving method of a display device driving a display panel in a first mode in which a driving frequency is fixed or a second mode in which the driving frequency is varied, the driving method comprising:

counting an operation cycle of an emission driving circuit outputting an emission driving signal to the display panel in the second mode to output a count value;

comparing the count value with a preset first threshold value;

setting a first option signal to an active state when the count value is equal to or less than the preset first threshold value;

setting the first option signal to an inactive state when the count value is greater than the preset first threshold value; and performing an inversion operation of inverting a polarity of a data signal in units of at least one driving frame when the first option signal is in the active state or stopping the inversion operation of the data signal when the first option signal is in the inactive state.

19. The driving method of claim 18, further comprising:

comparing the count value with a preset second threshold value;

setting a second option signal to a second active state when the count value is equal to or less than the preset second threshold value;

setting the second option signal to a second inactive state when the count value is greater than the preset second threshold value; and performing a dithering operation for an image signal in response to an activated second option signal or stopping the dithering operation for the image signal when the second option signal is in the second inactive state.

20. The driving method of claim 18, wherein:

the driving frequency is varied in units of the at least one driving frame in the second mode, and a period of the operation cycle is fixed and not varied according to the driving frequency.

* * * * *